(12) United States Patent
Hayduchok et al.

(10) Patent No.: US 11,478,825 B2
(45) Date of Patent: Oct. 25, 2022

(54) MATERIAL HANDLING APPARATUS FOR DELIVERING OR RETRIEVING ITEMS

(71) Applicant: OPEX Corporation, Moorestown, NJ (US)

(72) Inventors: George Hayduchok, Mount Holly, NJ (US); Robert R. DeWitt, Marlton, NJ (US)

(73) Assignee: OPEX Corporation, Moorestown, NJ (US)

( * ) Notice: Subject to any disclaimer, the term of this patent is extended or adjusted under 35 U.S.C. 154(b) by 0 days.

(21) Appl. No.: 17/743,403

(22) Filed: May 12, 2022

(65) Prior Publication Data

US 2022/0266306 A1    Aug. 25, 2022

Related U.S. Application Data

(63) Continuation of application No. 17/515,122, filed on Oct. 29, 2021, now Pat. No. 11,358,175, which is a
(Continued)

(51) Int. Cl.
*B07C 3/08* (2006.01)
*B07C 7/00* (2006.01)
(Continued)

(52) U.S. Cl.
CPC .............. *B07C 3/087* (2013.01); *B07C 7/005* (2013.01); *B07C 7/02* (2013.01); *B61B 13/02* (2013.01);
(Continued)

(58) Field of Classification Search
CPC ........... B07C 7/005; B07C 3/087; B07C 7/02; B61B 13/02; B61C 11/04; B65G 1/04;
(Continued)

(56) References Cited

U.S. PATENT DOCUMENTS

| 1,119,214 A | 12/1914 | Anderson |
| 2,612,238 A | 12/1949 | Angelicola |
| 2,954,882 A | 10/1960 | Vacell |
| 3,337,069 A | 8/1967 | Burger |
| 3,536,194 A | 10/1970 | Novak |

(Continued)

FOREIGN PATENT DOCUMENTS

| CH | 683167 | 1/1994 |
| CN | 101495357 | 7/2009 |

(Continued)

OTHER PUBLICATIONS

"A Design Methodology for Operational Control Elements for Automatic Guided Vehicle Based Material Handling Systems" by Pius Judah Egbelu in Jul. 1982.
(Continued)

*Primary Examiner* — James R Bidwell
(74) *Attorney, Agent, or Firm* — Stephen Eland

(57) ABSTRACT

A method and apparatus are provided for sorting or retrieving items to/from a plurality of destinations areas. The items are loaded onto one of a plurality of independently controlled delivery vehicles. The delivery vehicles follow a track that guides the delivery vehicles to/from the destination areas, which are positioned along the track. Once at the appropriate destination area, an item is transferred between the delivery vehicle and the destination area.

12 Claims, 13 Drawing Sheets

Related U.S. Application Data continuation of application No. 16/750,596, filed on Jan. 23, 2020, now Pat. No. 11,192,144, which is a continuation of application No. 16/039,713, filed on Jul. 19, 2018, now Pat. No. 10,576,505, which is a continuation of application No. 15/618,744, filed on Jun. 9, 2017, now Pat. No. 10,052,661, which is a continuation of application No. 14/690,541, filed on Apr. 20, 2015, now Pat. No. 9,687,883, which is a continuation of application No. 14/149,282, filed on Jan. 7, 2014, now Pat. No. 9,010,517, which is a continuation of application No. 13/631,817, filed on Sep. 28, 2012, now Pat. No. 8,622,194, which is a continuation of application No. 13/361,490, filed on Jan. 30, 2012, now Pat. No. 8,276,740, which is a continuation of application No. 12/983,726, filed on Jan. 3, 2011, now Pat. No. 8,104,601, which is a continuation of application No. 12/014,011, filed on Jan. 14, 2008, now Pat. No. 7,861,844.

(60) Provisional application No. 60/884,766, filed on Jan. 12, 2007.

(51) Int. Cl.
*B07C 7/02* (2006.01)
*B61B 13/02* (2006.01)
*B65G 67/02* (2006.01)
*B65G 1/04* (2006.01)
*B65G 1/06* (2006.01)
*B61C 11/04* (2006.01)

(52) U.S. Cl.
CPC ............... *B61C 11/04* (2013.01); *B65G 1/04* (2013.01); *B65G 1/065* (2013.01); *B65G 67/02* (2013.01); *Y02T 30/00* (2013.01)

(58) Field of Classification Search
CPC ........ B65G 1/065; B65G 67/02; B65G 1/137; Y02T 30/00
USPC ....................................... 414/273; 198/347.1
See application file for complete search history.

(56) References Cited

U.S. PATENT DOCUMENTS

| | | |
|---|---|---|
| 3,583,584 A | 6/1971 | Iacco |
| 3,647,026 A | 3/1972 | Alexander et al. |
| 3,738,506 A | 6/1973 | Cornford et al. |
| 3,796,327 A | 3/1974 | Meyer et al. |
| 3,800,963 A | 4/1974 | Holland |
| 3,978,995 A | 9/1976 | Zollinger et al. |
| 4,053,741 A | 10/1977 | Ainoya et al. |
| 4,082,042 A | 4/1978 | Barry |
| 4,310,276 A | 1/1982 | Castagnoli |
| 4,395,181 A | 7/1983 | Loomer |
| 4,509,635 A | 4/1985 | Emsley et al. |
| 4,554,873 A | 11/1985 | Rex |
| 4,854,439 A | 8/1989 | Ueda |
| 4,963,251 A | 10/1990 | Bohm et al. |
| 5,012,749 A | 5/1991 | Passage, Jr. |
| 5,067,932 A | 11/1991 | Edwards |
| 5,096,354 A | 3/1992 | Wu |
| 5,096,355 A | 3/1992 | Schroder |
| 5,135,344 A | 8/1992 | Kita et al. |
| 5,165,504 A | 11/1992 | Leccore |
| 5,379,229 A | 1/1995 | Parsons et al. |
| 5,676,514 A | 10/1997 | Higman et al. |
| 5,842,555 A | 12/1998 | Gannon et al. |
| 5,901,805 A | 5/1999 | Murakami et al. |
| 5,990,437 A | 11/1999 | Coutant et al. |
| 6,024,425 A | 2/2000 | Imai et al. |
| 6,098,550 A | 8/2000 | Tsuboi |
| 6,149,366 A | 11/2000 | Deandrea |
| 6,183,184 B1 | 2/2001 | Shiwaku |
| 6,240,851 B1 | 6/2001 | Oudakker et al. |
| 6,246,023 B1 | 6/2001 | Kugle |
| 6,262,863 B1 | 7/2001 | Ostwald et al. |
| 6,652,213 B1 | 11/2003 | Mitchell et al. |
| 6,671,580 B2 | 12/2003 | Campbell et al. |
| 6,762,382 B1 | 7/2004 | Danelski |
| 6,805,526 B2 | 10/2004 | Stefani |
| 6,859,009 B2 | 2/2005 | Jablin |
| 6,895,301 B2 | 5/2005 | Mountz |
| 7,008,164 B2 | 3/2006 | Rokkaku |
| 7,066,315 B2 | 6/2006 | Tanaka |
| 7,097,095 B2 | 8/2006 | Conard et al. |
| 7,101,139 B1 | 9/2006 | Benedict |
| 7,138,596 B2 | 11/2006 | Pippin et al. |
| 7,201,139 B2 | 4/2007 | Fuwa et al. |
| 7,381,022 B1 | 6/2008 | King |
| 7,591,630 B2 * | 9/2009 | Lert, Jr. ............... B65G 1/0492 414/280 |
| 7,729,797 B2 | 6/2010 | Akamatsu |
| 7,861,844 B2 * | 1/2011 | Hayduchok ............. B61B 13/02 198/370.1 |
| 7,943,431 B2 | 4/2011 | Benedict |
| 8,104,601 B2 * | 1/2012 | Hayduchok ............. B07C 3/087 198/347.1 |
| 8,276,740 B2 | 10/2012 | Hayduchok et al. |
| 8,594,835 B2 | 11/2013 | Lert et al. |
| 8,622,194 B2 | 1/2014 | deWitt et al. |
| 9,010,517 B2 | 4/2015 | Hayduchok et al. |
| 9,187,244 B2 * | 11/2015 | Toebes ................ B65G 1/0492 |
| 9,519,882 B2 | 12/2016 | Galluzzo et al. |
| 9,687,883 B2 | 6/2017 | Hayduchok et al. |
| 9,815,625 B2 * | 11/2017 | DeWitt ................ B65G 1/0492 |
| 9,952,589 B1 | 4/2018 | Brazeau |
| 10,052,661 B2 | 8/2018 | Hayduchok et al. |
| 10,071,857 B2 | 9/2018 | DeWitt et al. |
| 10,435,241 B2 * | 10/2019 | Lert ..................... B65G 1/1378 |
| 10,576,505 B2 | 3/2020 | Hayduchok et al. |
| 10,850,922 B1 * | 12/2020 | Alspaugh ............... B65G 15/14 |
| 10,865,053 B2 * | 12/2020 | DeWitt ................... B07C 3/082 |
| 10,940,998 B2 * | 3/2021 | Valinsky ............... B65G 1/1373 |
| 10,994,941 B1 * | 5/2021 | Dwivedi ................ B65G 35/06 |
| 11,142,398 B2 * | 10/2021 | Lert, Jr ................ B65G 1/0478 |
| 11,192,144 B2 * | 12/2021 | Hayduchok ............ B65G 1/065 |
| 11,338,996 B2 * | 5/2022 | Zhu ..................... B65G 1/0492 |
| 11,358,175 B2 | 6/2022 | Hayduchok et al. |
| 2002/0037208 A1 | 3/2002 | Patrito |
| 2004/0037680 A1 | 2/2004 | Sato et al. |
| 2004/0234364 A1 | 11/2004 | Ehrenleitner et al. |
| 2005/0047895 A1 | 3/2005 | Lert, Jr. |
| 2005/0063801 A1 | 3/2005 | Durand et al. |
| 2005/0276679 A1 | 12/2005 | Frich |
| 2006/0045660 A1 | 3/2006 | Di Rosa |
| 2008/0247848 A1 | 10/2008 | Freudelsperger |
| 2008/0281717 A1 | 11/2008 | Kortelainen |
| 2010/0316468 A1 | 12/2010 | Lert |

FOREIGN PATENT DOCUMENTS

| | | |
|---|---|---|
| DE | 29715820 | 4/1999 |
| DE | 102005012516 | 9/2006 |
| EP | 1329397 | 7/2003 |
| JP | 54047283 | 4/1979 |
| JP | 2003104519 | 4/2003 |
| JP | 2005126172 | 5/2005 |
| JP | 2007520342 | 7/2007 |
| TW | I397482 B | 6/2013 |
| WO | 2003019425 | 3/2003 |
| WO | 2007116538 A1 | 10/2007 |

OTHER PUBLICATIONS

"Automated/Self Guided Vehicles (AGV/SGV) and System Design Considerations" by David Dziwis in 2005.

(56) References Cited

OTHER PUBLICATIONS

"Logistic Control for Fully Automated Large Scale Freight Transport Systems; Event Based Control for the Underground Logistic System Schiphol" by Alexander Verbraeck in Aug. 25, 2001.
"E-fulfillment:the Strategy and Operational Requirements" by J. Michael Tam Muhammad excerpt from Logistics Information Management vol. 16, Issue 5, pp. 350-362 on Feb. 9, 2016.
"Material Handling Robot System for Flow Through Storage Applications" by James Dill et al. in Nov. 1998.
"Mechanical Engineering Management and Manufacturing Handbook" by John Wiley & Sons, Inc. in 2006.
"Order-picking Industrial Robot" by H.J. Warnecke and K. Baumeister on Feb. 9, 1989.
"Respondent Invata, LLC'S Third Supplemental Responses To Complainant Opex Corporation'S First Set of Interrogatories" in U.S. ITC Investigation No. 337-TA-1293, dated Jun. 30, 2022.
Exhibit A for "Respondent Invata, LLC'S Third Supplemental Responses To Complainant Opex Corporation's First Set of Interrogatories" in U.S. ITC Investigation No. 337-TA-1293, dated Jun. 30, 2022.
Exhibit B for "Respondent Invata, LLC'S Third Supplemental Responses To Complainant Opex Corporation's First Set of Interrogatories" in U.S. ITC Investigation No. 337-TA-1293, dated Jun. 30, 2022.
Exhibit C for "Respondent Invata, LLC's Third Supplemental Responses To Complainant Opex Corporation's First Set of Interrogatories" in U.S. ITC Investigation No. 337-TA-1293, dated Jun. 30, 2022.
Exhibit D for "Respondent Invata, LLC's Third Supplemental Responses To Complainant Opex Corporation's First Set of Interrogatories" in U.S. ITC Investigation No. 337-TA-1293, dated Jun. 30, 2022.
"Notice of Prior Art By Respondents Invata, LLC and HC Robotics" in U.S. ITC Investigation No. 337-LA-1293, dated Apr. 27, 2022.

\* cited by examiner

MATERIAL HANDLING APPARATUS FOR DELIVERING OR RETRIEVING ITEMS

PRIORITY CLAIMS

The present application is a continuation of co-pending U.S. patent application Ser. No. 17/515,122 filed on Oct. 29, 2021, which is a continuation of U.S. patent application Ser. No. 16/750,596, filed Jan. 23, 2020 issued on Dec. 7, 2021, which is a continuation of U.S. patent application Ser. No. 16/039,713, filed Jul. 19, 2018 issued as U.S. Pat. No. 10,576,505, which is a continuation of U.S. patent application Ser. No. 15/618,744, filed Jun. 9, 2017 issued as U.S. Pat. No. 10,052,661, which is a continuation of U.S. patent application Ser. No. 14/690,541, filed Apr. 20, 2015 issued as U.S. Pat. No. 9,687,883, which is a continuation of U.S. patent application Ser. No. 14/149,282, filed Jan. 7, 2014 issued as U.S. Pat. No. 9,010,517, which is a continuation of U.S. patent application Ser. No. 13/631,817, filed Sep. 28, 2012 issued as U.S. Pat. No. 8,622,194, which is a continuation of U.S. patent application Ser. No. 13/361,490 filed Jan. 30, 2012 issued as U.S. Pat. No. 8,276,740, which is a continuation of U.S. patent application Ser. No. 12/983,726 filed Jan. 3, 2011 issued as U.S. Pat. No. 8,104,601, which is a continuation of U.S. patent application Ser. No. 12/014,011 filed Jan. 14, 2008 issued as U.S. Pat. No. 7,861,844, which claims priority to U.S. Provisional Patent Application No. 60/884,766 filed on Jan. 12, 2007. The present application claims priority to each of the foregoing applications and the entire disclosure of each of the foregoing applications is hereby incorporated by reference.

FIELD OF THE INVENTION

The present invention relates to a material handling system for sorting or retrieving items. More specifically, the present invention relates to a material handling system incorporating a plurality of destination areas arranged along a track for guiding a plurality of vehicles for carrying items to and/or from the destination areas.

BACKGROUND OF THE INVENTION

Sorting documents and mail pieces manually is laborious and time consuming. For example, thousands of large organizations employ numerous people full-time to manually sort and deliver incoming and interoffice mail and documents. For instance, a large company may receive 5,000 mail pieces that need to be sorted and delivered each day to different departments and/or individuals. Such volumes require a significant number of employees dedicated to sorting and delivering the mail. Nonetheless, such volume is not typically sufficient to justify the expense of traditional automated sorting equipment, which is quite expensive. Additionally, the mail for such organizations is typically quite diverse, which makes it more difficult, and therefore more expensive, to automate the sorting procedures.

Various systems for sorting have been developed to address the needs of mail rooms for large organizations. However, the known systems suffer from several problems; the most significant are cost and size. Accordingly, there is a need for a compact and affordable automated sorting system that is able to meet the needs of mid- to large-sized organization that handle several thousand mail pieces each day.

Similarly, may large organizations have extensive storage areas in which numerous items are stored. Sorting and retrieving items from the hundreds or thousands of storage areas requires significant labor to perform manually, and the known systems of automatically handling the materials are either very expensive or have limitations that hamper their effectiveness. Accordingly, there is a need in a variety of material handling applications for automatically storing and/or retrieving items.

SUMMARY OF THE INVENTION

In light of the foregoing, a system provides a method and apparatus for delivering items to storage locations. The system includes a plurality of storage locations, such as bins, and a plurality of delivery vehicles for delivering items to the storage locations or retrieving items from the storage locations.

In one embodiment, the system may include a plurality of interconnected vertical and horizontal sections so that the vehicles may travel along a path changing from a horizontal direction to a vertical direction. Further, the vehicles may be driven such that the orientation of an item on the vehicle stays constant as the vehicles changes from a horizontal direction of travel to a vertical direction of travel.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
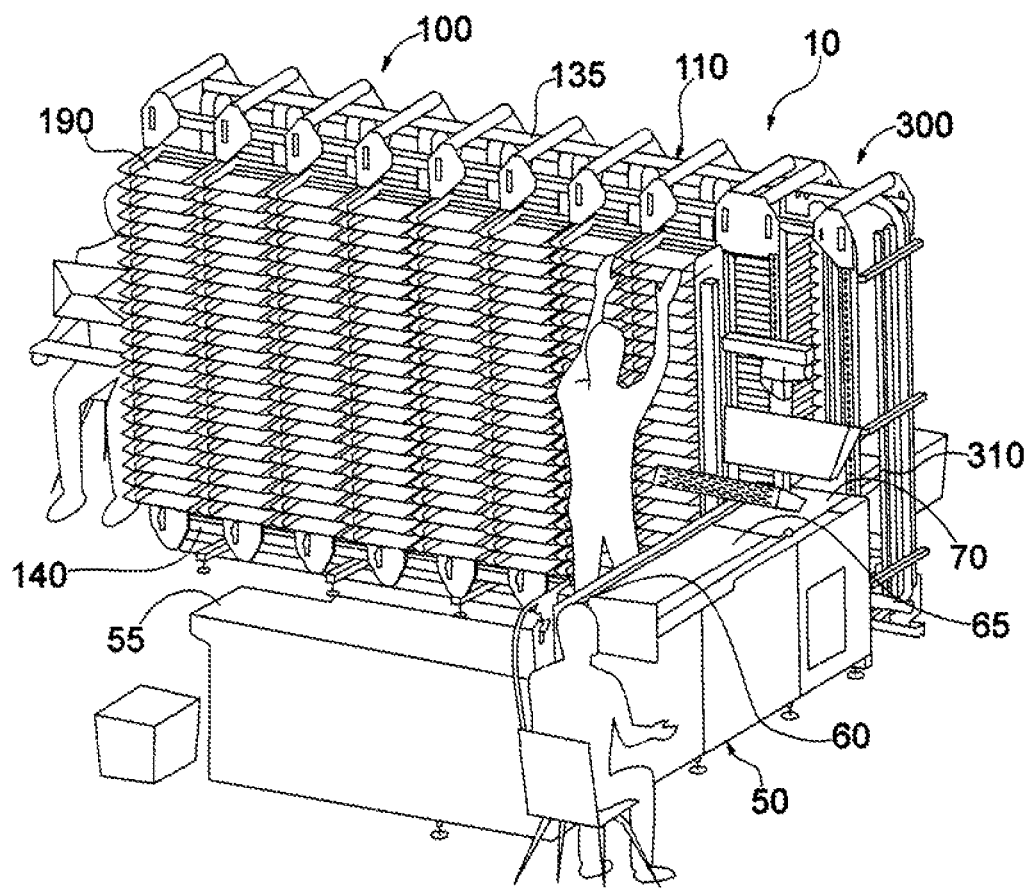
FIG. 1 is a perspective view of a sorting apparatus.

Referring now to FIGS. 1-18, an apparatus for sorting items such as documents or mail pieces is designated generally 10. The apparatus 10 includes a plurality of delivery vehicles or cars 200 to deliver items to a plurality of sort locations, such as output bins 190. At a loading station 310, each car 200 receives an item from an input station 50 and delivers it to the appropriate bin.

The cars 200 travel along a track 110 to the sort locations. The track has a horizontal upper rail 135 and a horizontal lower rail 140, which operates as a return leg. A number of parallel vertical track legs 130 extend between the upper rail and the lower return leg. In the present instance, the bins 190 are arranged in columns between the vertical track legs 130.

After a piece is loaded onto a car, the car travels upwardly along two pairs of vertical tracks legs and then horizontally along two upper tracks 135. The car 200 travels along the upper rail until it reaches the appropriate column containing the bin for the piece that the car is carrying. The track 110 includes gates 180 that fire to direct the car 200 down the vertical legs and the car stops at the appropriate bin. The car 200 then discharges the piece into the bin.

After discharging the piece, the car 200 continues down the vertical legs 130 of the column until it reaches the lower rail 140. Gates fire to direct the car along the lower rail, and the car follows the lower rail to return to the loading station 310 to receive another piece.

The cars 200 are semi-autonomous vehicles that each have an onboard power source and an onboard motor to drive the cars along the track 110. The cars also include a loading/unloading mechanism 210, such as a conveyor, for loading pieces onto the cars and discharging the pieces from the cars.

Since the system 10 includes a number of cars 200, the positioning of the cars is controlled to ensure that the different cars do not crash into each other. In one embodiment, the system 10 uses a central controller 350 that tracks the position of each car 200 and provides control signals to each car to control the progress of the cars along the track. The central controller 350 may also control operation of the various elements along the track, such as the gates 180.

Input Station

At the input station 50, the mail pieces are separated from one another so that the pieces can be conveyed serially to the loading station 310 to be loaded onto the cars 200. Additionally, at the input station information is determined for each piece so that the piece can be sorted to the appropriate bin.

A variety of configurations may be used for the input station, including manual or automatic configurations or a combination of manual and automated features. In a manual system, the operator enters information for each piece and the system sorts the mail piece accordingly. In an automatic system, the input system includes elements that scan each mail piece and detect information regarding each piece. The system then sorts the mail piece according to the scanned information.

In an exemplary manual configuration, the input system includes a work station having a conveyor, an input device, such as a keyboard, and a monitor. The operator reads information from a mail piece and then drops in onto a conveyor that conveys the piece to the loading station 310. Sensors positioned along the conveyor track the piece as the conveyor transports the mail piece toward the loading station. An example of a work station having a conveyor for receiving dropped pieces and tracking the pieces is provided in pending U.S. application Ser. No. 10/862,021, filed Jun. 4, 2004, which was published Jan. 27, 2005 under Publication No. US 2005-0018214 A1 and which is incorporated herein by reference. The conveyor receives mail pieces dropped by an operator and tracks the mail pieces as they are transported along the conveyor.

In an exemplary automatic configuration, the system includes an imaging station, having an imaging device such as a high speed line scanning camera. The imaging station scans each mail piece to detect information regarding the destination for each piece. The system analyzes the image data to determine the destination information and then electronically tags the mail piece with the destination and sorts the piece accordingly. An example of a system having an automated imaging station for scanning pieces as they are conveyed is described in U.S. patent application Ser. No. 09/904,471, filed Jul. 13, 2001, which was published Jan. 16, 2003 under Publication No. US 2003-0014376 $A_1$, and which is incorporated herein by reference.

Figure 2:
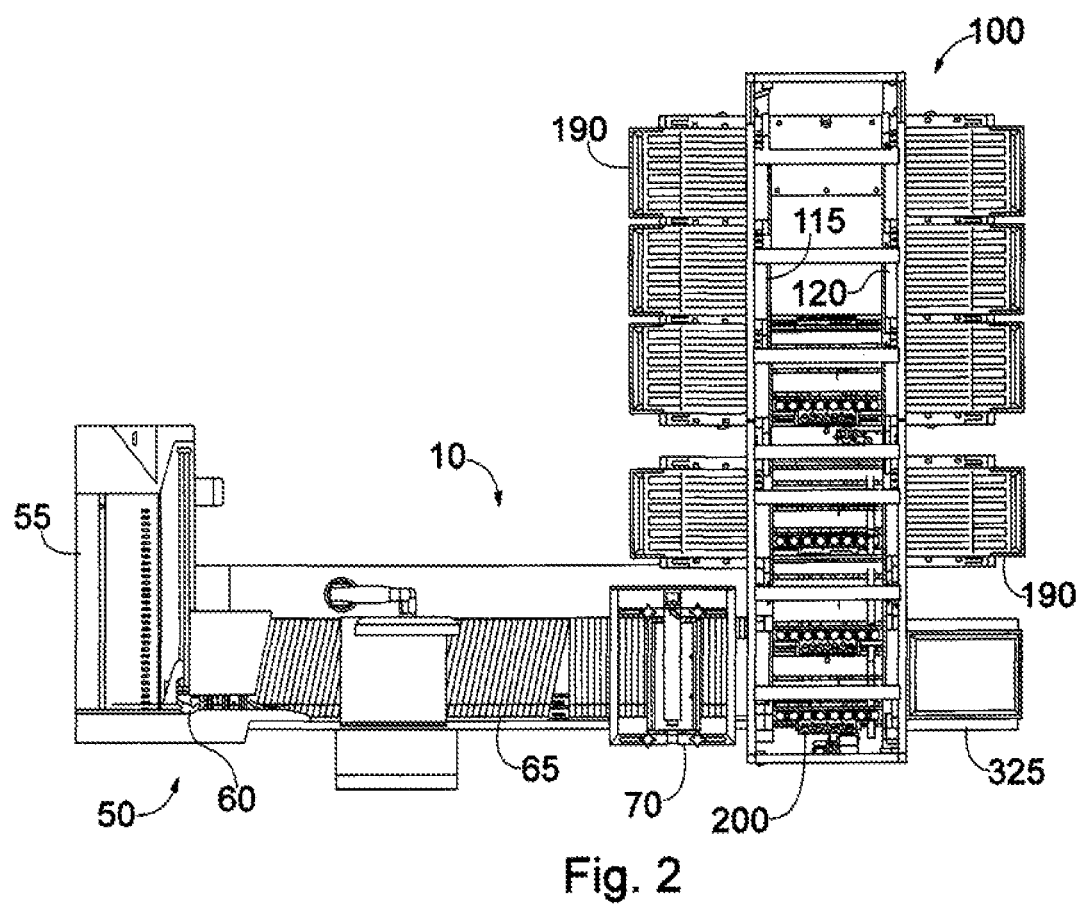
FIG. 2 is a plan view of the sorting apparatus illustrated in FIG. 1.
Figure 3:
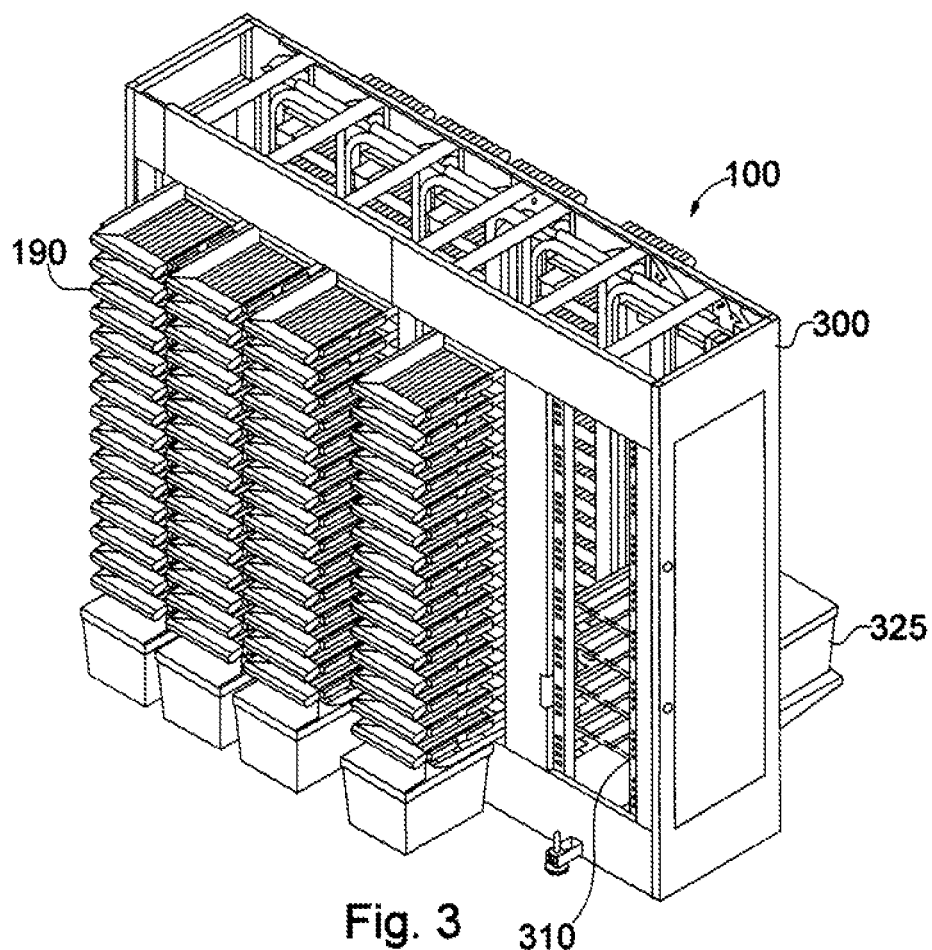
FIG. 3 is a fragmentary perspective view of the sorting apparatus illustrated in FIG. 1, shown without an input station.

FIGS. 1 and 2 illustrate such an automated system. The input station includes an input bin 55 for receiving a stack of mail. A feeder 60 in the input bin serially feeds mail pieces from the input bin to a conveyor 65. An imaging station 70 positioned along the conveyor scans the mails pieces as the pieces are conveyed to the loading station 310. The system 10 analyzes the image data to read information for the mail piece, such as the recipient's address.

The conveyor 65 conveys the mail piece to the loading station 310. At the loading station the conveyor 65 conveys the mail piece onto a car 200. As discussed further below, after the mail piece is loaded onto the car, the car moves away from the loading station and another car moves into position at the loading station to receive the next piece of mail.

In certain instances, the system may not be able to automatically identify the relevant information for a mail piece. To process such pieces, the system may include an operator to input the relevant information so that the mail piece can be sorted. For instance, the system may include an operator station having an input device and a display, such as a monitor. If the system cannot automatically determine the address within a pre-determined time period, the system displays the scanned images for the mail piece to the monitor so that the operator at the work station can view the images and manually enter the information using the input device.

In addition to the automated and manual systems described above, the system may be configured in a hybrid or semi-automated configuration having some operations performed manually and others automated. For instance, the system may include a manual input station that also has an imaging station. Since the system can handle a wide variety of items, it may be desirable to have an operator input the pieces manually so that the pieces are properly oriented and separated. The imaging station then scans the items and processes the imaging data to determine the address information for the pieces. Additionally, the operator station may include an input device and a display for inputting information if the address for a piece cannot be automatically determined, as discussed above. The operator can input the information as soon as the system indicates to the operator that it cannot determine the information for a piece. Alternatively, as discussed below, the car may be directed to a buffer if the information for a piece cannot be determined. In such an instance, the cars having such pieces will remain in the buffer while the system continues to process pieces for which the system can determine the relevant information. The operator can continue to manually drop pieces and wait until a number of pieces need manual keying of information. The operator can then switch from the operation of dropping pieces to the operation of manually keying the pieces, sometimes referred to as local video encoding (LVE). The operator can continue keying until some or all of the pieces in the buffer have been successfully coded, and then the operator can go back to the operation of manually dropping pieces. As yet another alternative, it may be desirable to incorporate a separate operator station having the input device and display so that one operator can input the mail at the input station and a separate operator can input the information for pieces having addresses that cannot be automatically determined.

As can be seen from the foregoing, the input station 50 may be configured in a wide range of options. The options are not limited to those configurations described above, and may include additional features, such as an automated scale for weighing each piece, a labeler for selectively applying labels to the mail pieces and a printer for printing information on the mail pieces or on the labels.

Additionally, in the foregoing description, the system is described as having a single input station 50. However, it may be desirable to incorporate a plurality of input stations positioned along the system 10. By using a plurality of input stations, the feed rate of pieces may be increased. In addition, the input stations may be configured to process different types of items. In this way, each input station could be configured to efficiently process a particular category of items. For instance, if the system is configured to process documents, such as mail, one input station may be configured to process standard envelopes, while another input station may be configured to process larger mails, such as flats. Similarly, one input station may be configured to automatically process mail by scanning it and automatically determining the recipient. The second input station may be configured to process rejects, such as by manually keying in information regarding the recipient.

Sorting Station

Referring to FIGS. 1-6, the system includes a sorting station 100, such as an array of bins 190 for receiving the pieces. In the present instance, the sorting station includes a number of bins arranged in columns. Additionally, the sorting station 100 includes a track 110 for guiding the cars 200 to the bins 190.

The track 110 includes a horizontal upper rail 135 and a horizontal lower rail 140. A plurality of vertical legs 130 extend between the upper horizontal leg and the lower horizontal leg 140. During transport, the cars travel up a pair of vertical legs from the loading station 310 to the upper rail 135 (as described below, the cars actually travel up two pairs of rails because the track includes a forward track and a parallel opposing track). The car then travels along the upper rail until reaching the column having the appropriate bin. The car then travels downwardly along two front vertical posts and two parallel rear posts until reaching the appropriate bin, and then discharges the mail piece into the bin. The car then continues down the vertical legs until reaching the lower horizontal leg 140. The car then follows the lower rail back toward the loading station.

Figure 13:
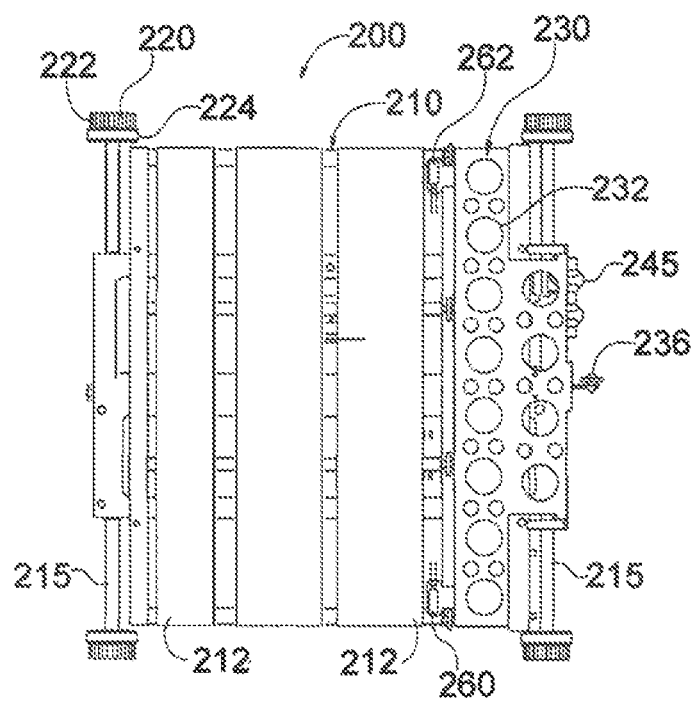
FIG. 13 is a plan view of the delivery vehicle illustrated in FIG. 12.
Figure 14:
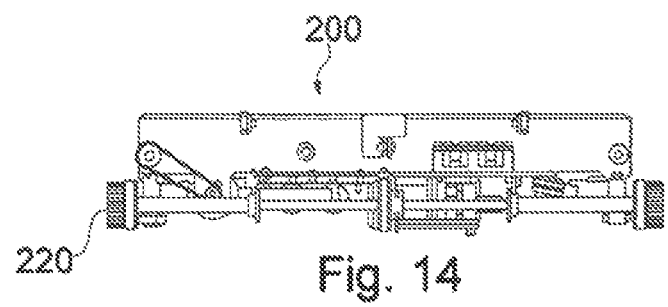
FIG. 14 is a right side view of the delivery vehicle illustrated in FIG. 12.
Figure 15:
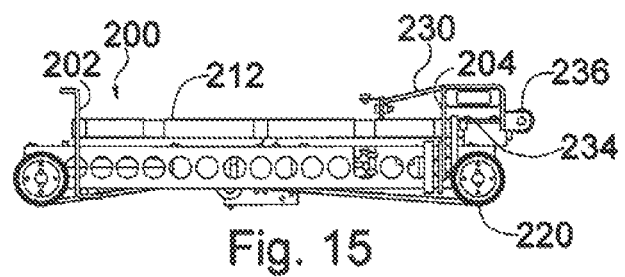
FIG. 15 is a front elevational view of the delivery vehicle illustrated in FIG. 12.

As can be seen in FIG. 2, the track 110 includes a front track 115 and a rear track 120. The front and rear tracks 115, 120 are parallel tracks that cooperate to guide the cars around the track. As shown in FIG. 13, each of the cars includes four wheels 220: two forward wheel and two rearward wheels. The forward wheels 220 ride in the front track, while the rearward wheel ride in the rear track. It should be understood that in the discussion of the track the front and rear tracks 115, 120 are similarly configured opposing tracks that support the forward and rearward wheels 220 of the cars. Accordingly, a description of a portion of either the front or rear track also applies to the opposing front or rear track.

Figure 18:
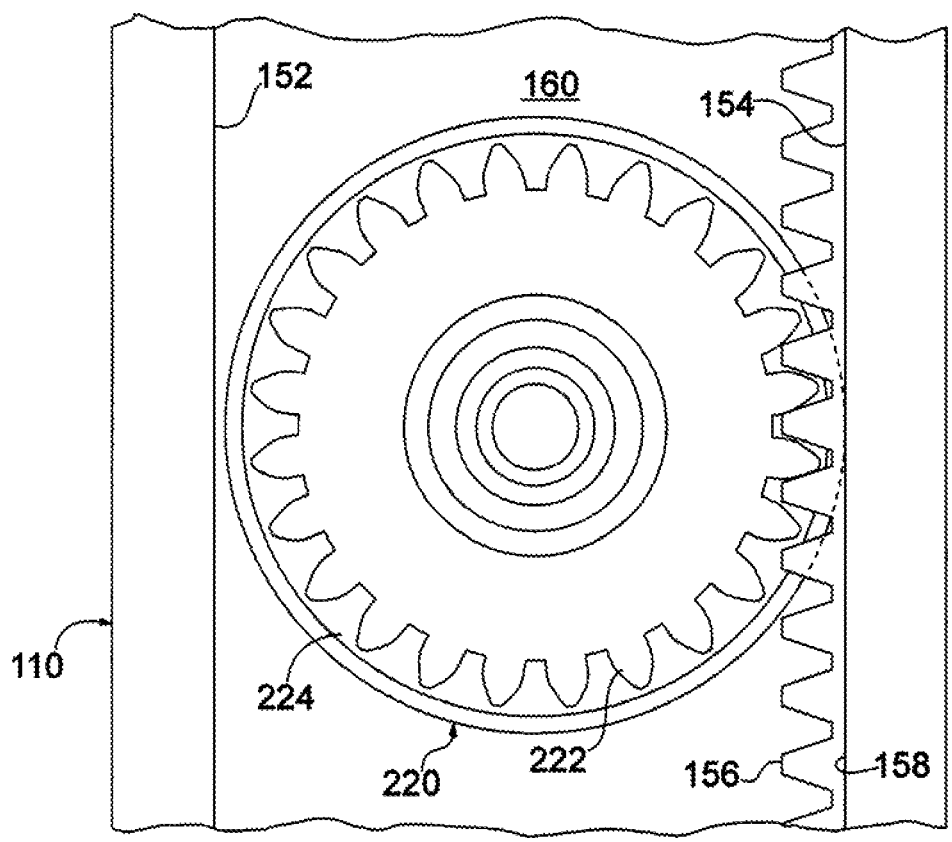
FIG. 18 is an enlarged view of a wheel of the delivery vehicle illustrated in FIG. 12, shown in relation to the track of the sorting apparatus illustrated in FIG. 1.

Referring to FIG. 18 the details of the track will be described in greater detail. The track 110 includes an outer wall 152 and an inner wall 154 that is spaced apart from the outer wall and parallel to the outer wall. The track also has a back wall 160 extending between the inner and outer walls. As can be seen in FIG. 18, the outer and inner walls 152, 154 and the back wall form a channel. The wheels 220 of the car ride in this channel.

Figure 11:
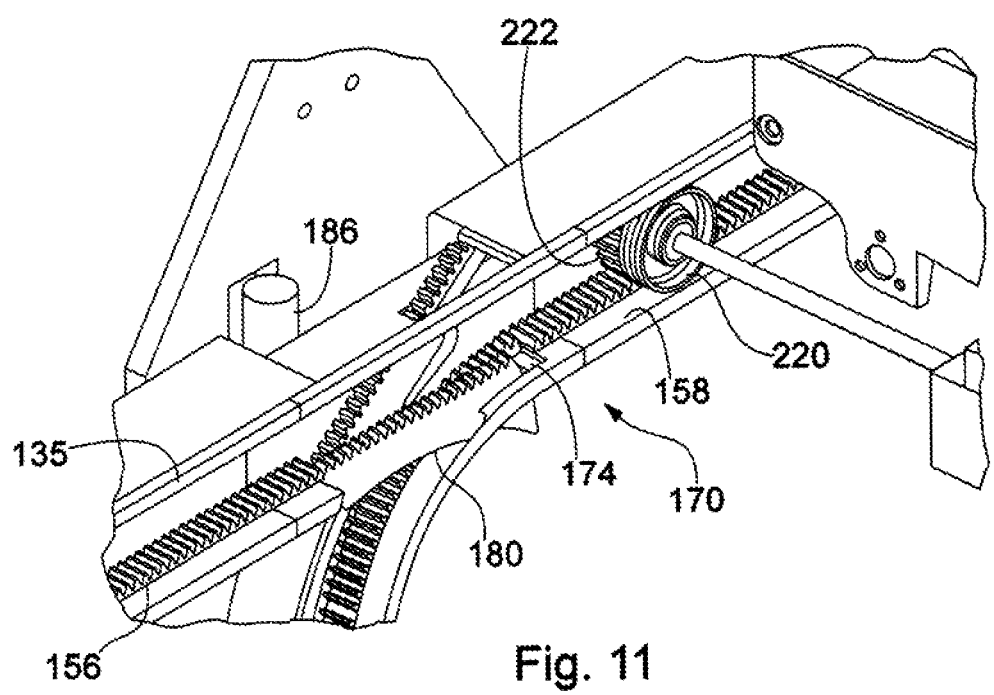
FIG. 11 is an enlarged fragmentary perspective view of a portion of the track illustrated in FIG. 1, showing details of a gate, with the gate shown in an open position in phantom.
Figure 12:
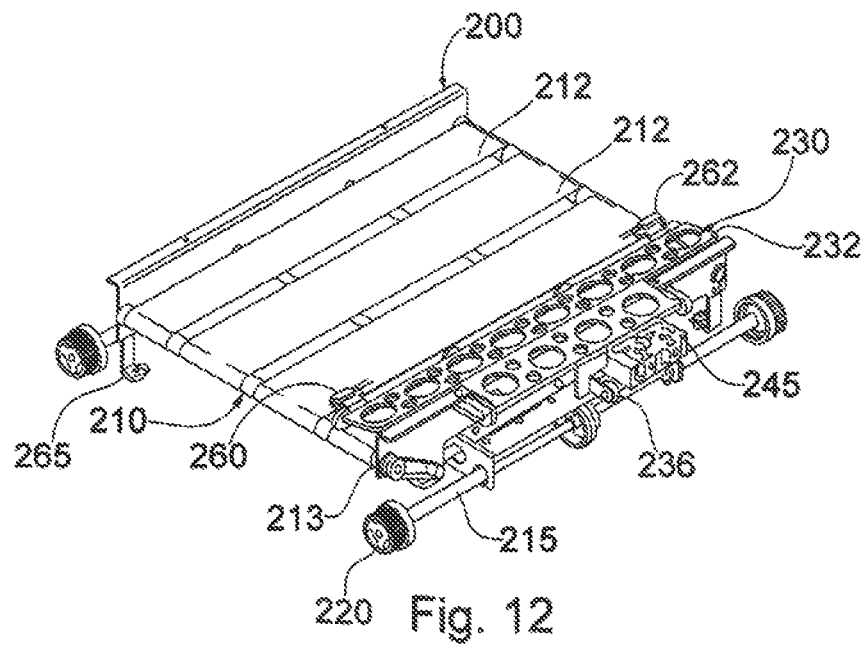
FIG. 12 is a top perspective view of a delivery vehicle of the apparatus illustrated in FIG. 1.

Referring to FIG. 11, the track includes both a drive surface 156 and a guide surface 158. The drive surface positively engages the cars to enable the car to travel along the track. The guide surface 158 guides the car, maintaining the car in operative engagement with the drive surface 156. In the present instance, the drive surface is formed of a series of teeth, forming a rack that engages the wheels of the cars as described further below. The guide surface 158 is a generally flat surface adjacent the rack 156. The rack 156 extends approximately halfway across the track and the guide surface 158 extends across the other half of the track. As shown in FIGS. 11 and 18, the rack 156 is formed on the inner wall 154 of the track. The opposing outer wall 152 is a generally flat surface parallel to the guide surface 158 of the inner wall.

Figure 10:
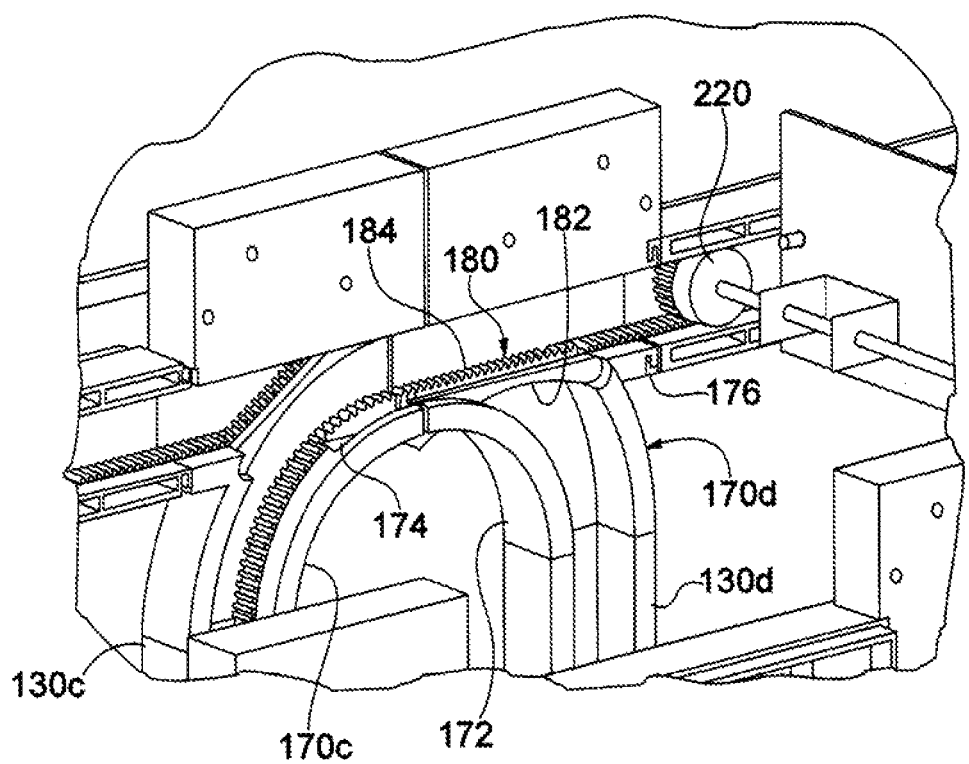
FIG. 10 is an enlarged fragmentary perspective view of a portion of the track illustrated in FIG. 1, showing details of a gate.

As described above, the track includes a plurality of vertical legs extending between the horizontal upper and lower rails 135, 140. An intersection 170 is formed at each section of the track at which one of the vertical legs intersects one of the horizontal legs. Each intersection includes an inner branch 172 that is curved and an outer branch 176 that is generally straight. FIG. 10 illustrates both a right-hand intersection 170c and a left-hand intersection 170, which are mirrors of one another. In FIG. 10, the intersections 170c, 170d illustrate the portion of the track in which two vertical legs 130 intersect the upper horizontal leg 135. The intersections of the vertical legs with the lower rail incorporate similar intersections, except the intersections are reversed. Specifically, the point at which vertical leg 130c intersects the lower rail incorporates an intersection configured similar to intersection 170d, and the point at which vertical leg 130d intersects the lower rail incorporates an intersection configured similar to intersection 170c.

Each intersection 170 includes a pivotable gate 180 that has a smooth curved inner race and a flat outer race that has teeth that correspond to the teeth of the drive surface 156 for the track. The gate 180 pivots between a first position and a second position. In the first position, the gate 180 is closed so that the straight outer race 184 of the gate is aligned with the straight outer branch 176 of the intersection. In the second position, the gate is open so that the curved inner race 182 of the gate is aligned with the curved branch 172 of the intersection.

Accordingly, in the closed position, the gate is pivoted downwardly so that the outer race 184 of the gate aligns with the drive surface 156. In this position, the gate blocks the car from turning down the curved portion, so that the car continues straight through the intersection. In contrast, as illustrated n FIG. 10, when the gate is pivoted into the open position, the gate blocks the car from going straight through the intersection. Instead, the curved inner race 182 of the gate aligns with the curved surface of the inner branch 172 and the car turns through the intersection. In other words, when the gate is closed, a car goes straight through the intersection along either the upper rail 130 or the lower rail, depending on the location of the intersection. When the gate is opened, the gate directs the car from either a vertical rail to a horizontal rail or from a horizontal rail to a vertical rail, depending on the location of the intersection.

As can be seen in FIG. 11, the end of the gate remote from the pivot point of the gate flares outwardly so that the curved inner race matches the curved profile of the inner branch when the gate is open. As a result, the gate has a generally L-shaped configuration. To accommodate the flared end of the gate 180, the drive surface 156 of the inner branch has a notch or recessed portion. When the gate is closed, the notch provides clearance so that the outer race 184 of the gate lies flat, parallel with the drive surface of the outer branch 176. Further, in the example shown in FIG. 11, the gate is positioned along the upper rail 135 of the track 110. When the gate is closed, the recess in the inner branch of the intersection 170 allows the gate to lie flat so that it is aligned with the drive surface of the upper rail.

In the foregoing description, the gates allow one of the cars to either continue in the same direction (e.g. horizontally) or turn in one direction (e.g. vertically). However, in some applications, the system may include more than two horizontal rails that intersect the vertical columns. In such a configuration, it may be desirable to include a different rail that allows the cars to turn in more than one direction. For instance, if a car is traveling down a column, the gate may allow the car to turn either left or right down a horizontal rail, or travel straight through along the vertical column. Additionally, in some applications it may be desirable to allow the cars to travel upwardly, whereas in the system described above, the cars only travel downwardly through the sorting station. If the cars also travel upwardly in the sorting station, then the gates should be configured to accommodate and guide the cars when the cars travel upwardly through an intersection.

The gates 180 are controlled by signals received from the central controller 350. Specifically, each gate is connected with an actuator 186 that displaces the gate from the opened position to the closed position and back. There may be any of a variety of controllable elements operable to displace the gate. In the present instance, the actuator 186 is a solenoid having a linearly displaceable piston.

In the foregoing description, the sorting station 100 is described as a plurality of output bins 190. However, it should be understood that the system may include a variety of types of destinations, not simply output bins. For instance, in certain applications it may be desirable to sort items to a storage area, such as an area on a storage shelf. Alternatively, the destination may be an output device that conveys items to other locations. According to one example of an output device, the system may include one or more output conveyors that convey pieces away from the sorting system toward a different material handling or processing system. For instance, an output conveyor designated A may convey pieces to a processing center designated A. Therefore, if a piece is to be delivered to processing center A, the car will travel along the track to output conveyor A. Once the car reaches output conveyor A, the car will stop and transfer the piece onto output conveyor A. Output conveyor A will then convey the piece to processing center A. Further, it should be understood that the system may be configured to include a plurality of output devices, such as output conveyors.

In some embodiments, the system may include a plurality of output conveyors in addition to the output bins. In other embodiments, the system may only include a plurality of output devices, such as conveyors, and the system is configured to sort the pieces to the various output devices. Further still, the system may be configured to retrieve pieces from storage locations. In such embodiments, the cars may sort pieces to a storage location, such as a bin. Subsequently, one of the cars may travel to the storage location and retrieve the item from the storage location and transport it to one of the output devices.

One manner that the cars may retrieve items from the storage locations is by including a conveyor at the storage locations. In this way, an item at a storage location can be conveyed by the conveyor toward the track. When a car arrives at the storage location, the conveyor at the storage location conveys the item onto the car, similar to the manner in which a piece is loaded onto the car at the loading column. Accordingly, the system can sort pieces to a plurality of output devices, in addition to sorting pieces to a plurality of storage locations before subsequently retrieving the pieces and conveying the pieces to the output devices.

As discussed above, the system is operable to sort a variety of items to a plurality of destinations. One type of destination is a bin; a second type is a shelf or other location on which the item is to be stored; and a third type of destination is an output device that may be used to convey the item to a different location. The system may include one or more of each of these types or other types of destinations.

Delivery Vehicles

Referring now to FIGS. 12-17, the details of the delivery vehicles 200 will be described in greater detail. Each delivery vehicle is a semi-autonomous car having an onboard drive system, including an onboard power supply. Each car includes a mechanism for loading and unloading items for delivery.

The car 200 may incorporate any of a variety of mechanisms for loading an item onto the car and discharging the item from the car into one of the bins. Additionally, the loading/unloading mechanism 210 may be specifically tailored for a particular application. However, in the present instance, the loading/unloading mechanism 210 is a conveyor belt. Specifically, referring to FIGS. 12 and 15, the loading/unloading mechanism includes a plurality of narrow belts 212 that extend along the top surface of the car between two opposing walls 202, 204. The conveyor belts are reversible. Driving the belts in a first direction displaces the item toward the rearward end of the car; driving the belt in a second direction displaces the item toward the forward end of the car.

A conveyor motor 255 mounted on the underside of the car drives the conveyor belts 212. Specifically, the conveyor belts 212 are entrained around a forward roller 213 at the forward edge of the car, and a rearward roller at the rearward edge of the car. The conveyor motor 255 is connected with the forward roller 213 to drive the forward roller, thereby operating the conveyor belts.

The car includes four wheels 220 that are used to transport the car along the track 110. The wheels 220 are mounted onto two parallel spaced apart axles 215, so that two or the wheels are disposed along the forward edge of the car and two of the wheels are disposed along the rearward edge of the car.

Referring to FIG. 18, each wheel comprises an inner idler roller 224 and an outer gear 222 that cooperates with the drive surface 156 of the track. The idler roller 224 rotates freely relative to the axles, while the outer gear is fixed relative to the axle onto which it is mounted. In this way, rotating the axle operates to rotate the gear 222. Additionally, the idler roller is sized to have a diameter slightly smaller than the distance between the upper wall 152 and the lower wall 154 of the track. In this way, the idler roller may rotate freely within the track, while ensuring that the gear 222 of each wheel remains in operative engagement with the drive surface (i.e. the teeth) 156 of the track. Accordingly, when the vehicle is moving horizontally, the rollers carry the weight of the cart, while the gears 222 cooperate with the drive surface 156 of the track to drive the vehicle along the track.

Figure 16:
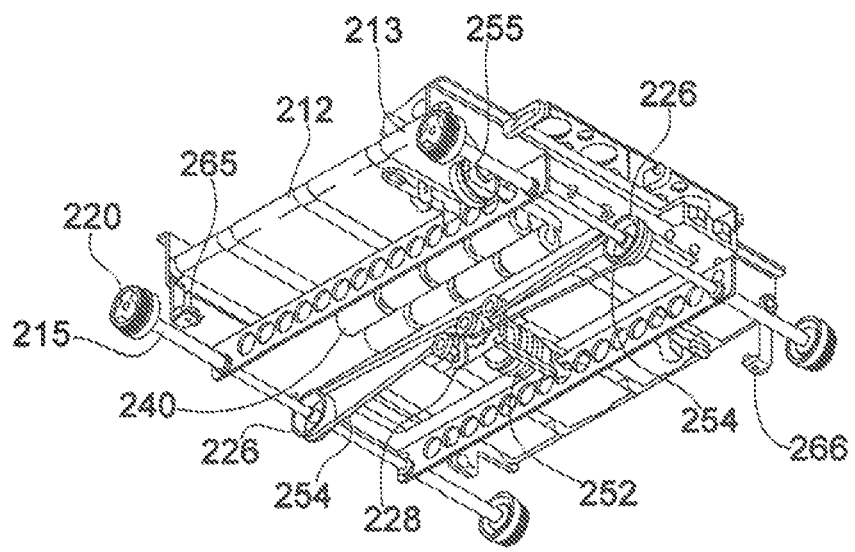
FIG. 16 is a bottom perspective view of the delivery vehicle illustrated in FIG. 12.
Figure 17:
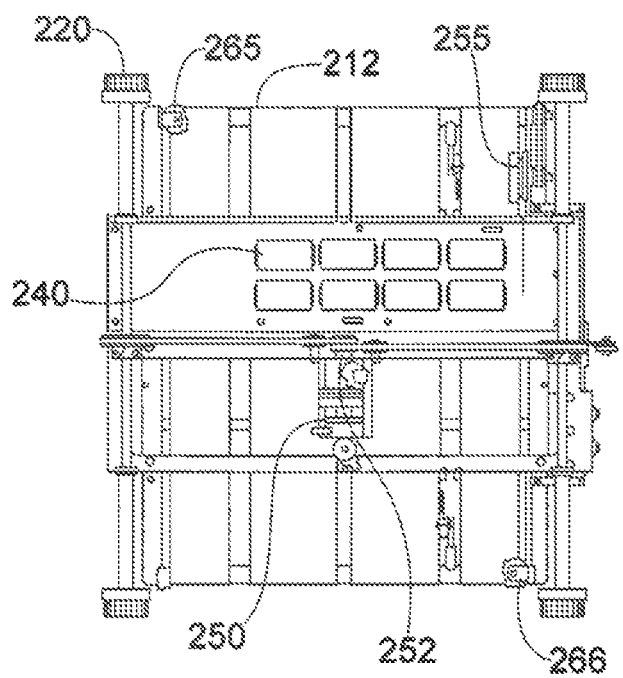
FIG. 17 is a bottom view of the delivery vehicle illustrated in FIG. 12.

The car includes an onboard motor 250 for driving the wheels 220. More specifically, the drive motor 250 is operatively connected with the axles to rotate the axles 215, which in turn rotates the gears 222 of the wheels. As shown in FIG. 16, the drive motor 250 is interconnected to the axles 215 via a pair of drive belts 254 that are driven by the drive motor.

The drive system for the car may be configured to synchronously drive the car along the track. In the present instance, the drive system is configured so that each gear is driven in a synchronous manner. Specifically, each gear 222 is connected to an end of one of the axles in a manner that substantially impedes rotation of the gear relative to the axle. In this way each axle drives the attached two gears in a synchronous manner. Additionally, in the present instance, both axles are driven in a synchronous manner so that all four gears are driven in a synchronous manner. There are various mechanisms that can be used to synchronously drive the axles. For instance, a pair of drive motors can be used to drive the axles, and the drive motors can be synchronized. However, in the present instance, a single drive motor 250 is used to drive both axles. Each axle includes a timing pulley 226 that is rigidly connected to the axle to prevent rotation of the pulley relative to the axle. Similarly, a timing pulley 228 is connected to the motor shaft. The drive belt 254 connecting the timing pulley 226 on the axle with the motor is a timing belt so that the rotation of the drive motor is precisely linked to the rotation of the axle. Although a single timing belt can be used to drive both axles synchronously, in the present instance, a pair of timing pulleys is connected to the motor shaft, and each timing pulley is connected to a corresponding timing pulley on one of the axles, as shown in FIG. 16.

The drive motor 250 includes a sensor that is operable to detect the rotation of the motor to thereby determine the distance the car has traveled. Since the gears 222 are rigidly connected with the axles, which are in turn synchronously connected with the drive motor, the forward distance that the car moves corresponds can be exactly controlled to correlate to the distance that the drive motor is displaced. Accordingly, the distance that a car has traveled along the determined path depends on the distance through which the car motor is rotated.

To detect the rotation of the drive motor 250, the motor includes a sensor 252 for detecting the amount of rotation of the drive motor. In the present instance the sensor 252 is a hall sensor. A portion of rotation of the motor corresponds to what is referred to as a tick. The sensor detects the number of ticks and sends a signal to the central processor 350, which determines how far along the designate path the car has traveled based on the known information regarding the path and the number of ticks that the sensor detects for the motor.

As the car travels along the track, an item on top of the car may tend to fall off the car, especially as the car accelerates and decelerates. Therefore, in the present instance, the car includes a retainer 230 to retain the element on the car during delivery. As illustrated in FIGS. 12-17, the retainer 230 is a hold down that clamps the item against the top surface of the car.

The retainer includes an elongated pivotable arm 232. A biasing element, such as a spring, biases the arm downwardly against the top surface of the retainer 230. The retainer 230 further includes an operator 234 in the form of a tab. Pushing downwardly on the tab raises the clamp from the top surface of the conveyor to allow a piece to be loaded onto the car or discharged from the car.

The car 200 may be powered by an external power supply, such as a contact along the rail that provides the electric power needed to drive the car. However, in the present instance, the car includes an onboard power source 240 that provides the requisite power for both the drive motor 250 and the conveyor motor 255. Additionally, in the present instance, the power supply is rechargeable. Although the power supply may include a known power source, such as a rechargeable battery, in the present instance, the power supply 240 is made up of one or more ultracapacitors. Ultracapacitors are extremely high energy density capacitors. Capacitors store electrical energy by physically separating positive and negative charges, in contrast to the chemical means a battery uses. Ultracapacitors rely on an electrostatic effect, which is physical rather than chemical, and highly reversible. The ultracapacitors can accept very high amperage to recharge the ultracapacitors. By using a high current, the ultracapacitors can be recharged in a very short time, such as a few seconds or less.

The car includes one or more contacts for recharging the power source 240. In the present instance, the car includes a plurality of brushes 245, such as copper brushes that are spring-loaded so that the brushes are biased outwardly. The brushes 245 cooperate with a charging rail in the loading station to recharge the power source, as described further below.

Each car includes at least one and preferably two load sensors for detecting the items as it is loaded onto the car. The sensor(s) ensure that the mail piece is properly positioned on the car. In the present instance, the car includes a forward loading sensor 260 and a rearward loading sensor 262. The forward loading sensor detects the leading edge of the item as it is loaded onto the car. The forward loading sensor 260 also detects the trailing edge of the item to ensure that the entire length of the item is loaded onto the car. Similarly, the rearward sensor 262 detects the leading edge and in certain instances, may detect the trailing edge of the mail piece. The loading sensors 260, 262 may be simple I/R sensors that detect the presence or absence of a document or mail piece.

Although the car operates in response to signals received from the central controller 350, which tracks the location of each car, the car may also include a reader 265 for reading indicia along the track to confirm the position of the car. For instance, each bin may be assigned a unique bar code, and the forward reader may scan the track or other area around the bin 190 at which an item is to be delivered. The data that the central processor has regarding the path that the car is to follow and the data regarding the distance the car has traveled based on the data regarding the rotation of the drive motor 250 should be sufficient to determine whether the car 200 is positioned at the appropriate bin. Nonetheless, it may be desirable to double check the location of the car before the item is discharged into the appropriate bin. Therefore, the scanner may operate to scan and read information regarding the bin at which the car is stopped. If the scanned data indicates that the bin is the appropriate bin, then the car discharges its item into the bin. Similarly, the car may have a second reader 266 for reading indicia adjacent the rearward edge of the car. The second reader 266 may be used in applications in which the system is set up to utilize a first series of bins 190 along the forward side and a second series of bins along the rearward side of the track 110.

In foregoing description, the cars have drive gears that interact with teeth in the track to guide the cars around the track. Additionally, as described further below in the operation section, the location of the car may be controlled based on information regarding how far the car has traveled. In such applications it is desirable to synchronize the drive wheels of the car. However, in some applications alternative control systems may be used. For instance, the location of the cars can be controlled based on signals from sensors positioned along the track or indicators positioned along the track. In such instances, the cars may be configured to use a drive mechanism that is not synchronous as described above.

As discussed further below, the car further includes a processor for controlling the operation of the car in response to signals received from the central processor. Additionally, the car includes a wireless transceiver so that the car can continuously communicate with the central processor as it travels along the track. Alternatively, in some applications, it may be desirable to incorporate a plurality of sensors or indicators positioned along the track. The car may include a reader for sensing the sensor signals and/or the indicators, as well as a central processor for controlling the operation of the vehicle in response to the sensors or indicators.

Loading Column

Figure 6:
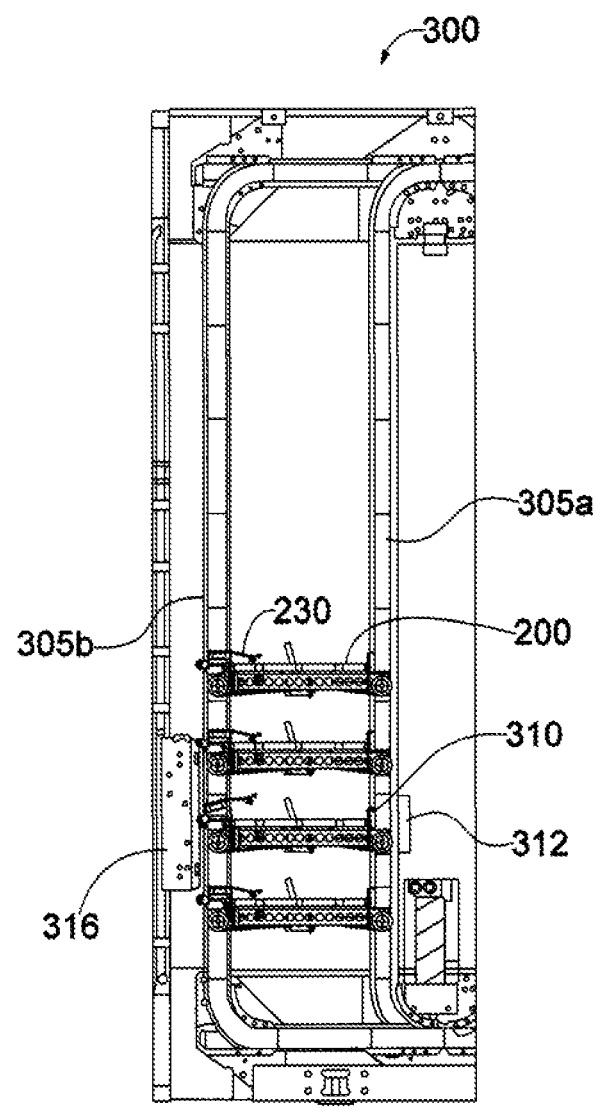
FIG. 6 is a fragmentary sectional view of a loading station of the sorting apparatus illustrated in FIG. 1.
Figure 7:
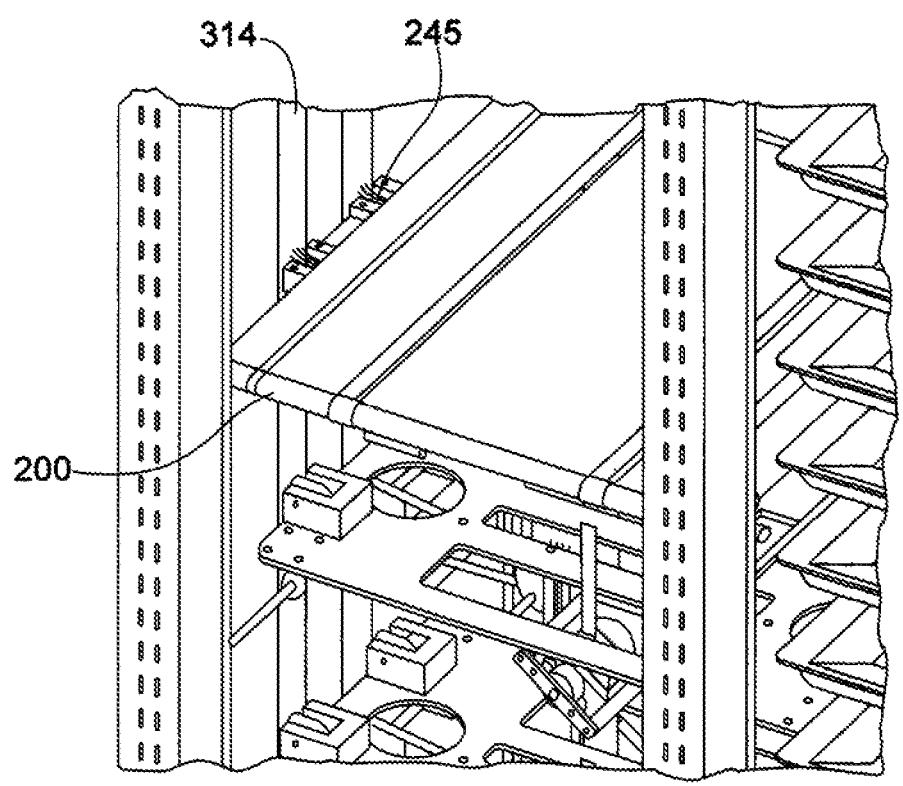
FIG. 7 is an enlarged fragmentary perspective view of a portion of the loading station of the apparatus illustrated in FIG. 3.

Referring now to FIGS. 6-7 the details of the loading column 300 will be described in greater detail. The loading column 300 is formed adjacent the output end of the input station 50. The loading column 300 is formed of a front pair of vertical rails 305a, 305b and a corresponding rearward set of vertical rails. The loading station 310 is positioned along the loading column. The loading station 310 is the position along the track in which the car 200 is aligned with the discharge end of the conveyor of the input station 50. In this way, a mail piece from the input station may be loaded onto the car as it is conveyed toward the car from the input station.

Although the central processor 350 tracks the position of the car, a home sensor 312 is positioned adjacent the loading station 310. When the home sensor detects the car, the position for the car is known relative to a fixed point along the track, and the central processor resets the position of the car to the home or zero position.

Referring to FIG. 7, a pair of charging rails 314 are disposed along the vertical rails 305a, 305b. The charging rails are conductive strips connected with an electrical supply. The charging contacts 245 of the car 200 engage the conductive strips to recharge the ultracapacitors 240. Specifically, the biasing element of the brushes 245 biases the brushes outwardly toward the charging contacts. The electricity flowing through the charging contact 245 is a high amperage, low voltage source that allows the ultracapacitors to recharge in a few seconds or less. In addition, since the power supply provided by the ultracapacitors last for only a few minutes, the car recharges each time it travels through the loading column.

Additionally, it may be desirable to incorporate a startup charging rail similar to the charging rails described above, but disposed along either the return rail or the rails in the column adjacent to the loading column, depending on where the cars are stored when the cars are shut down. Since the cars use ultracapacitors, it is possible that the ultracapacitors will discharge while the system is shut down. Therefore, upon startup the cars will not have any charge and will not be able to move to the loading column to charge the ultracapacitors. Accordingly, the system may include a startup charging rail disposed along a rail that the cars contact when the cars are stored during shutdown. If the cars are stored in the loading column and the adjacent column during shutdown, then the startup rail is disposed in the column adjacent the loading column. Alternatively, if the cars are stored on the return rail and the loading column during shutdown, then the startup rail is disposed along the return rail. In this way, when the system is started, a charging current is supplied to the cars through the startup charging rail and the charging rail in the loading column.

As discussed previously, each car 200 includes a retainer 230 to hold down items on the car during transport. The retainer should be opened at the loading station to allow an item to be loaded onto the car. Accordingly, as shown in FIG. 6, an actuator 316 is positioned along the column. The actuator 316 projects inwardly toward the cars as the cars are conveyed up the loading column. As a car is conveyed upwardly in the loading column 300, the hold down actuator 316 contacts the hold down operator or tab 236. The interaction between the actuator 316 and the tab 236 causes the retainer to open, so that items can be loaded onto the car. As the car moves upwardly past the actuator 316, the tab 236 on the car disengages the actuator, thereby releasing the retainer, thereby holding down or clamping the mail piece against the top surface of the vehicle.

In the foregoing description, the loading station has been described as a column in which an item is loaded onto the car and the car then travels upwardly to the horizontal upper rail 135. However, in some applications in may be desirable to configure the loading station so that the items are loaded onto the cars at or near the top of the vertical column. In such an application, the load on the cars would be reduced since the car will not have to lift the item loaded on the car. In order to load the items on the cars at the top of the conveyor, a vertical conveyor may be added to the system. For instance, a conveyor angled upwardly may convey the items upwardly to the top of the column to load the items onto the cars. Alternatively, one or more of a variety of conveyor configurations can be used to transport to items toward the top of the loading column to load the items onto the cars.

Operation

The system 10 operates as follows. An item is processed at the input station 50 to identify a characteristic of the piece that is indicative of where the piece should be sorted. For instance, the item may be a mail piece that is to be sorted according to department, box number or recipient. If the mail pieces are sorted by department, the piece may be processed to identify either an indicator of the department (such as box number) or the piece may be processed to identify the recipient. The central controller maintains a database that correlates various data to identify the destination bin. For instance, the database may correlate the recipient names with the appropriate department if the mail is being sorted according to department. In other embodiments, the piece may be a part that has a product code and the database may correlate the product code with the sort location.

As discussed previously, the input station may process the items automatically or manually. In a manual mode, the operator manually enters information regarding a piece and then drops the piece on a conveyor. The system electronically tags the piece with the sort information and the conveyor conveys the piece toward the loading station. Alternatively, if the input system is an automated system, the piece is automatically scanned to identify the relevant sort characteristic. For instance, the input station may use a scanner, such as a bar code scanner to read the postnet code on a piece, or the input station may include an imaging device, such as a high speed line scan camera in combination with an OCR engine to read information on the piece.

To prepare to receive an item, a car 200 moves along the track toward the loading station 310 in the loading column 300. As the car approaches the loading station, the operator 236 for the hold down 230 engages the actuator 316, which pivots the hold down upwardly to prepare the car to receive an item, as illustrated in FIG. 6. When the car 200 moves into position at the loading station 310 the home sensor detects the presence of the car and sends a signal to the central processor 350 indicating that the car is positioned at the loading station. In the following description, the item being sorted is described as being a mail piece. It should be understood that such an item is an exemplary application of the system. As described above, the system can be configured to sort a variety of items in a variety of material handling applications.

Once the car is positioned at the loading station, the input station conveys a mail piece onto the car. As the mail piece is being conveyed onto the car 200, the loading mechanism 210 on the car loads the mail piece onto the car. Specifically, the input station conveys the mail piece into contact with the conveyor belts 212 on the car. The conveyor belts 212 rotate toward the rearward side of the car, thereby driving the mail piece rearwardly on the car.

The operation of the conveyor belts is controlled by the loading sensors 260, 262. The forward loading sensor detects the leading edge of the mail piece as the mail piece is loaded onto the car. Once the forward loading sensor 260 detects the trailing edge of the mail piece, a controller onboard the car determines that the mail piece is loaded on the car and stops the conveyor motor. Additionally, the onboard controller may control the operation of the conveyor in response to signals received from the rearward sensor 262. Specifically, if the rearward sensor 262 detects the leading edge of the mail piece, then the leading edge of the mail piece is adjacent the rearward edge of the car. To ensure that the mail piece does not overhang from the rearward edge of the car, the controller may stop the conveyor once the rearward sensor detects the leading edge of the mail piece. However, if the rearward sensor detects the leading edge of the mail piece before the forward sensor detects the trailing edge of the mail piece, the controller may determine that there is a problem with the mail piece (i.e. it is too long or two overlapping mail pieces were fed onto the car. In such an instance, the car may communicate an error message with the central controller, which may declare an error and provide an indicator to the operator that the car at the loading station requires attention. Alternatively, a reject bin 325 may be positioned behind the loading station so that mail pieces on the car at the loading station can be ejected into the reject bin 325. In this way, if there is an error loading a mail piece onto a car, the mail piece can simply be ejected into the reject bin, and a subsequent mail piece can be loaded onto the car.

After a mail piece is loaded onto the car, the car moves away from the loading station. Specifically, once the onboard controller detects that a mail piece is properly loaded onto the car, the onboard controller sends a signal to start the drive motor 250. The drive motor 250 rotates the axles, which in turn rotates the gears 222 on the wheels 220. The gears 222 mesh with the drive surface 156 of the vertical rails 305 in the loading column to drive the car upwardly. Specifically, the gears and the drive surfaces mesh and operate as a rack and pinion mechanism, translating the rotational motion of the wheels into linear motion along the track 110.

Since the cars move up the loading column from the loading station, the destination for the car does not need to be determined until after the car reaches the first gate along the upper rail 135. For instance, if an automated system is used at the input station to scan and determine the characteristic used to sort the mail pieces, it may take some processing time to determine the relevant characteristic. The time that it takes to convey the mail piece onto the car and then convey the car up the loading column will typically be sufficient time to determine the relevant characteristic for the mail piece. However, if the characteristic is not determined by the time the car reaches the upper rail, the car may be directed down the second column, which is the column next to the loading column. The car travels down the second column to the lower rail 140, and then back to the loading column. The car may stop in the second column to provide additional time to determine the characteristic. However, after waiting for a pre-determined period the system may declare that the address cannot be determined and the car may be advanced from the second column and the piece may be discharged to a reject bin. Alternatively, rather than declare an error the car may continue to travel around the loop from the loading column to the second column until the characteristic is determined or until a predetermined time at which the central controller declares an error. Additionally, rather than using the reject bin when the system is unable to determine the characteristic for a mail piece, one of the bins in the second column can also be used as a reject bin. In this way, the cars are ready to receive a mail piece as soon as the car reaches the loading station, without having to eject the problem mail piece into the reject bin 325 at the loading station.

As described above, the system includes a loop that can be utilized as a buffer track to provide additional processing time to analyze the characteristic for the mail piece if necessary. Although the first and second columns can be used as the buffer loop, other columns can be used as a buffer loop if desired.

The foregoing discussion described the process for buffering a car if the system is unable to determine the characteristic for the mail piece by the time the car reaches the top rail. However, for most mail pieces, the system should be able to identify the characteristic without having to buffer the car. The following discussion describes the operation of the system assuming that the characteristic for the mail piece is determined before the car reaches the upper rail 135.

Once the characteristic for the mail piece is determined, the central controller 350 determines the appropriate bin 190 for the mail piece. Based on the location of the bin for the mail piece, the route for the car is determined. Specifically, the central controller determines the route for the car and communicates information to the car regarding the bin into which the mail piece is to be delivered. The central controller then controls the gates along the track to direct the car to the appropriate column. Once the car reaches the appropriate column the car moves down the column to the appropriate bin. The car stops at the appropriate bin 190 and the onboard controller sends an appropriate signal to the conveyor motor 255 to drive the conveyor belts 212, which drives the mail piece forwardly to discharge the mail piece into the bin. Specifically, the top of the car aligns with the gap between the appropriate bin 190 and the bottom edge of the bin that is immediately above the appropriate bin.

As discussed above, the central controller 350 controls the operation of the gates 180 in response to the location of the car 200 and the route that the car is to follow to deliver the mail piece. Additionally, as discussed below, the central controller controls the gates in response to the position of other cars on the track.

Figure 9:
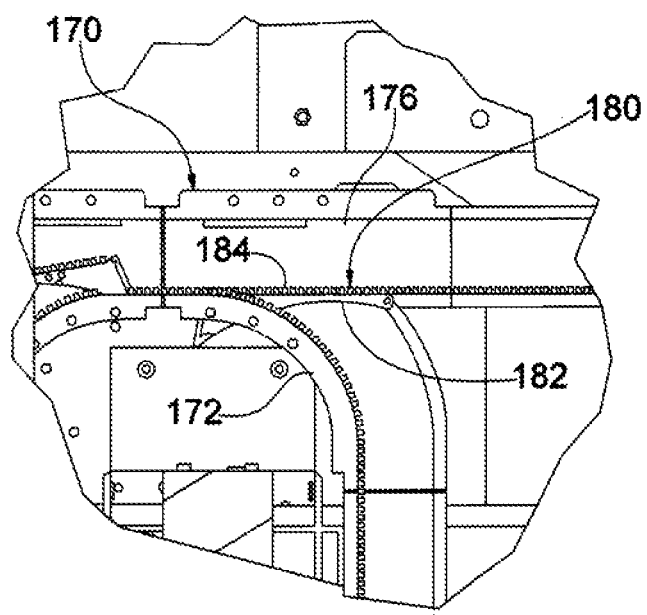
FIG. 9 is an enlarged fragmentary view of a portion of track of the apparatus illustrated in FIG. 1, showing details of a gate in a closed position.

As the car 200 travels along the upper rail 135 and approaches a column, the gates for the vertical rails 130 are controlled as follows. If the car is to pass over the column on the way to the next column, the gates are displaced into the closed position, as shown in FIG. 9. Specifically, both gates at the top of the column are closed so that the outer race 184 of the gate aligns with the straight track, with the outer race aligning with the drive surface 156 of the track 110. In this way, the gates provide a straight drive surface that cooperates with the drive surface 156 to allow the car to travel over the column.

Figure 5:
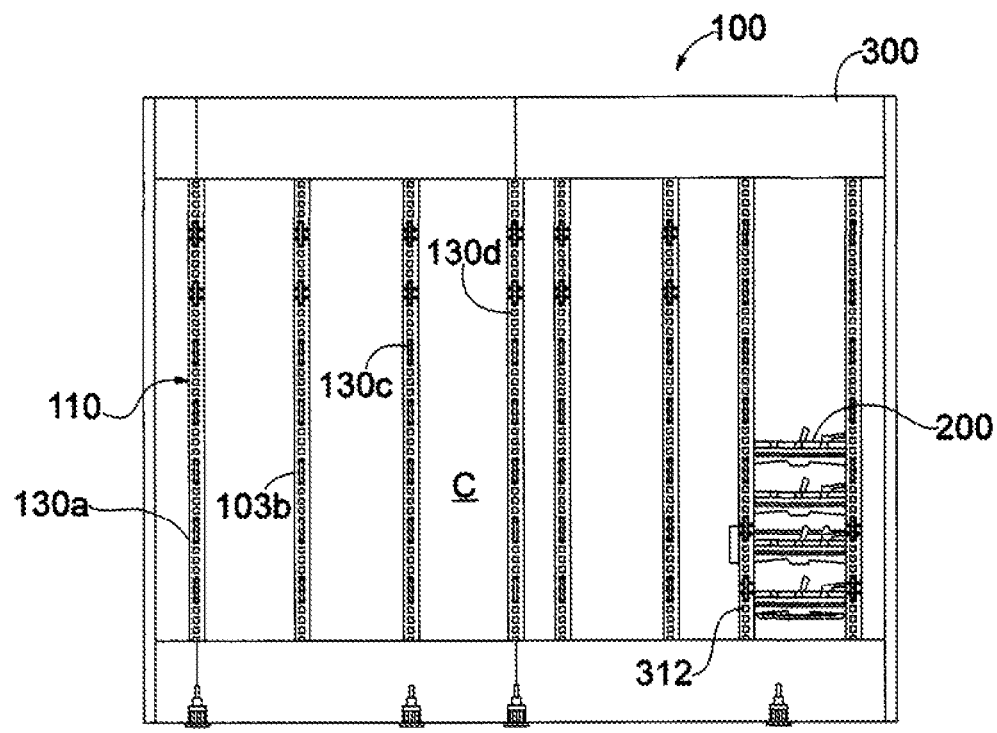
FIG. 5 is a front elevational view of the sorting apparatus illustrated in FIG. 3, shown without discharge bins.

When the car comes to a column that it is to turn down, the gates are controlled as follows. Referring to FIG. 5, the columns can be seen without the bins attached. The view in FIG. 5 is from the front of the apparatus 10, so the car will be traveling along the upper rail from the right to the left in the perspective of FIG. 5. In the following discussion, the car is to be conveyed to a bin in the column designated C in FIG. 5. Column C includes two pairs of vertical legs. The first pair is front and back vertical legs 130c on the left side of column C; the second pair is front and back vertical legs 130d on the right side of column C.

Figure 8:
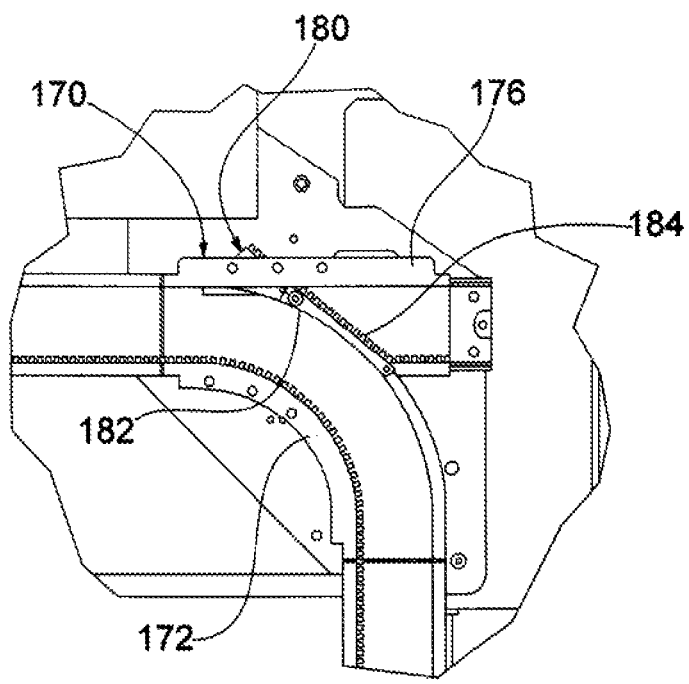
FIG. 8 is an enlarged fragmentary view of a portion of track of the apparatus illustrated in FIG. 1, showing details of a gate in an open position.

In order for the car to travel down column C, the wheels on the left side of the car travel down legs 130c and the right side wheels travel down legs 130d. Therefore, as the car approaches column C, the gates at the top of 130d are displaced to the closed position so that the left side wheels remain on the upper rail and pass over the right side legs 130d. After the left side wheels of the car pass over the right legs 130c, the gates 180 at the top of the right legs 130d are displaced into the open position so that the right side wheels can turn down legs 130d. Specifically, after the left side wheels pass right legs 130d, the central controller operates the solenoids 186 of the gates 180 at the top of legs 130 to displace the gates into the open position, as shown in FIG. 8 (note that the view in FIG. 8 is taken from the rear side of the apparatus so that the perspective of the gates is reversed relative to the front side). The gates 180 block the straight path through the intersection 170 and the curved inner race 182 of the gates direct the right side wheels down vertical legs 130d. Similarly, the gates 180 at the top of the left side legs 130c are displaced into the open position to direct the left side wheels down vertical legs 130c.

As the car approaches the intersections at the bottom of legs 130c and 130d, the gates are operated similarly to the above description, but in reverse. Specifically, as the car approaches the intersections 170 at the bottom of legs 130c and 130d, the gates 180 in the intersections are displaced into the opened position so that the gates direct the forward and leading wheels to turn down the lower rail. From the perspective of FIG. 5, the car travels from left to right after the car reaches the lower rail. After the car passes though the intersections at the bottom of the rails 130c, 130d, the gates at the bottom of right side legs 130d are displaced into the closed position before the left side wheels of the car reach the intersection at the bottom of the right side legs 130d. In this way, the left side wheels of the car pass straight through the intersection at the bottom of legs 130d along the bottom rail 140.

As discussed above, the central controller 350 controls the operation of the gates in response to the position of the car and more specifically in response to the position of the left hand and right hand wheels of the car. The gates are fired sequentially to ensure that the different pairs of wheels are directed down the proper vertical legs. Alternatively, the operation of the gates may be controlled by signals received from the cars. Specifically, the cars may include a transmitter that transmits a signal to the central controller indicating that it is in proximity to a gate that is to be fired. Further still, the car may include an indicator that may be scanned as the car approaches the gate. Based on the indicator and the know destination for the car, the gate may fire. Still further, the car may include an mechanical actuator that selectively triggers or actuates a gate to appropriately direct the car.

One of the advantages of the system as described above is that the orientation of the cars does not substantially change as the cars move from travelling horizontally (along the upper or lower rails) to vertically (down one of the columns). Specifically, when a car is travelling horizontally, the two front geared wheels 220 cooperate with the upper or lower horizontal rail 135 or 140 of the front track 115, and the two rear geared wheels 220 cooperate with the corresponding upper or lower rail 135 or 140 of the rear track 120. As the car passes through a gate and then into a column, the two front geared wheels engage a pair of vertical legs 130 in the front track 115, and the two rear geared wheels engage the corresponding vertical legs in the rear track 120.

As the car travels from the horizontal rails to the vertical columns or from vertical to horizontal, the tracks allow all four geared wheels to be positioned at the same height. In this way, as the car travels along the track it does not skew or tilt as it changes between moving horizontally and vertically. Additionally, it may be desirable to configure the cars with a single axle. In such a configuration, the car could be oriented generally vertically as opposed to the generally horizontal orientation of the cars described above. In the single axle configuration, the weight of the cars could maintain the orientation of the cars. However, when using a vertical single axle car, the orientation of the sort locations would be re-configured to accommodate the vertical orientation of the cars. Similarly, the loading station would also be re-configured to load the pieces onto the cars in the vertical orientation.

Traffic Control

Since the system includes a number of cars 200, the system controls the operation of the different cars to ensure the cars do not collide into one another. In the following discussion, this is referred to as traffic control.

A variety of methodologies can be used for traffic control. For instance, the traffic control can be a distributed system in which each car monitors its position relative to adjacent cars and the onboard controller controls the car accordingly. One example of such as system utilizes proximity sensors on each car. If the proximity sensor for a car detects a car within a predefined distance ahead of the car, the onboard controller for the trailing car may control the car by slowing down or stopping the trailing car. Similarly, if a car detects a car within a predefined distance behind the car, the lead car may speed up unless the lead car detects a car ahead of it within the predefined distance. In this way, the cars may control the speed of the cars independently based on the feedback from the proximity sensors.

Although the system may use a distributed system for traffic control, in the present instance, the system uses a centralized system for traffic control. Specifically, the central controller 350 tracks the position of each car 200 and provides traffic control signals to each car based on the position of each car relative to adjacent cars and based on the route for each car.

In the present instance, the central controller 350 operates as the traffic controller, continuously communicating with the cars as the cars travel along the track 110. For each car, the central controller determines the distance that each car can travel, and communicates this information with the cars. For instance, if car B is following car A along the track, and car A is at point A, car B can safely travel to a point just before point A without crashing into car A. As car A advances to a subsequent point B along the track, car B can travel safely to a point just before point B without crashing into car A.

The cars continuously communicate with the central controller to provide information indicative of their positions, so that the central controller can continuously update the safe distances for each car as the cars advance around the track.

Although the foregoing discussion is limited to determining safe zones based on the positions of the various cars on the track, the determination of safe zones is based on other factors that affect the traffic. For instance, when calculating the safe distance for a car, the central controller considers the distance between the car and the next gate, as well as the distance to the destination bin for the car.

As can be seen from the foregoing, increasing the frequency of communication between the cars and the central controller increases the efficiency of the traffic flow along the track. Accordingly, in the present instance, the traffic control is designed to communicate with a car once for every inch the car travels along the track. Therefore, if a car travels at 25 inches per second, the central controller communicates with the car every 40 msec. Further, it is desirable to have the cars travel at up to 50 inch/sec. Therefore, it is desirable to configure the communications to allow the cars to communicate with the central controller every 20 msec.

In addition, to the foregoing variables used to calculate safe distances, information regarding the track profile ahead of each car is used to calculate safe distances. For instance, the central controller determines whether the path ahead of a car is sideways movement, uphill movement (i.e. movement vertically upwardly) or downhill movement (i.e. movement vertically downwardly).

One of the issues in traffic control relates to merging at intersections 170. The problem arises when a car needs to merge onto the return rail 140. If two cars will arrive at the intersection close enough to collide, one of the cars needs to have priority and the other car needs to wait or slow down to allow the first car to go through.

A first method for controlling merging traffic is based on determining the next gap large enough for a car to have time to pass through an intersection without colliding with another car. In other words, if a first car approaches an intersection and it is determined that the gap between the first car and a second car is not sufficient for the first car to pass through, the first car waits at the intersection until there is a gap large enough to allow the first car to pass through.

A second method for controlling merging traffic is based on determining which car is closest to the homing sensor at the loading station 310. The car with the shortest distance to the homing sensor gets priority at the intersection.

Another factor that the traffic controller considers when calculating safe distances relates to the position of cars in adjacent columns. In the present instance, most of the adjacent columns share a common vertical rail. For instance, in FIG. 5, the leftmost column uses vertical rails 130*a* and 130*b*. The column next to the leftmost column uses vertical rails 130*b* and 130*c*.

However, in the present instance, some of the columns may have two vertical rails 130 that are independent from the adjacent columns. For instance, the loading column 300 has two independent rails that are not shared with the adjacent column. Therefore, cars can travel up the loading column without regard to the position of cars in the column next to the loading column. Furthermore, as shown in FIG. 5, it may be desirable to configure the column next to the loading column so that it also has two independent vertical rails. In this way, cars can more freely travel up the loading column and down the adjacent column to provide a buffer loop as described previously.

Accordingly, when calculating safe distances, the traffic controller evaluates the position of cars in adjacent columns if the cars share a common vertical rail to ensure that the two cars do not collide as the car travel down the adjacent columns.

Figure 4:
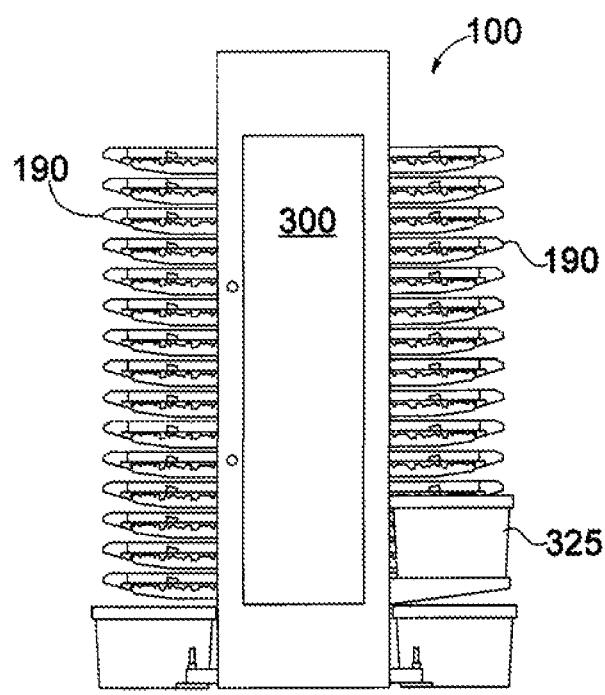
FIG. 4 is a right side view of the sorting apparatus illustrated in FIG. 3.

In the foregoing discussion, the sorting of items was described in relation to an array of bins disposed on the front of the sorting station 100. However, as illustrated in FIGS. 2 & 4, the number of bins in the system can be doubled by attaching a rear array of bins on the back side of the sorting station. In this way, the cars can deliver items to bins on the front side of the sorting station by traveling to the bin and then rotating the conveyor on the car forwardly to eject the piece into the front bin. Alternatively, the cars can deliver items to bins on the rear side of the sorting station by traveling to the bin and then rotating the conveyor on the car rearwardly to eject the piece into the rear bin.

Additionally, the sorting station 100 is modular and can be readily expanded as necessary simply by attaching an additional section to the left end of the sorting station. Further, although the foregoing describes the array of bins as being essentially a two dimensional array in which the cars simply travel in X and Y directions, the sorting station can be expanded to add additional "runs" of track. Specifically, a separate sorting station parallel to or perpendicular to the sorting station illustrated in FIG. 2 may be connected to the sorting station. In this way, the car would travel in a third dimension relative to the X and Y directions of the sorting station illustrated in FIG. 2. For instance, additional sections of track may be connected to the sorting station illustrated in FIG. 2 perpendicular to the illustrated sorting station, so that the additional track forms an L-shape intersecting the loading column. In such a configuration, gates selectively direct the cars either down the upper rail 135 or rearwardly toward the additional track. Similarly, a plurality of parallel rows of sorting stations can be interconnected so that the cars selectively travel along a crossover rail until the car reaches the appropriate row. The car then travels down the row until it reaches the appropriate column as described above.

It will be recognized by those skilled in the art that changes or modifications may be made to the above-described embodiments without departing from the broad inventive concepts of the invention. For instance, in the foregoing description, the operation of the sorting station is described as being centralized with the central controller. However, it may be desirable to have the cars control the operation of the gates. According to one alternative, the cars incorporate one or more mechanical actuators that cooperate with an operator on the gate. The actuators on the cars are operable between first and second positions. In a first position, the actuator engages the gate operator to displace the gate into the closed position. In a second position, the actuator engages the gate to displace the gate into the open position. Alternatively, the gate may be biased toward the opened position, so that when the car actuator is in the second position it does not engage the gate operator. In another alternative, each car includes a mechanism for communicating with each gate. If the gate needs to be pivoted to direct an approaching car along a particular path, the car sends a signal to the gate indicating whether the gate should be opened or closed. In response to the signal from the car, the gate pivots to the appropriate position.

Further, in the above description, the system uses a wireless communication between the cars and the central controller. In an alternative embodiment, a communication line may be installed on the track and the cars may communicate with the central controller over a hard wired communication link. Still further, the system has been described as being useful in sorting incoming mail. However, the system may also be utilized to sort and prepare outgoing mail. For instance, after determining a characteristic for a mail piece, the system may print a marking onto the mail piece. For instance, after determining the recipient's address for a mail piece, the system determines which bin the mail piece is to be sorted to. As the mail piece is conveyed to the bin, a printer prints the appropriate postnet bar code on the piece before sorting the piece. To provide the printing functionality, the system may include a printer disposed along the track. When the car approaches the printer the car stops and at least partially discharges the mail piece to extend the mail piece toward the printer. The printer then prints the appropriate postnet code. The car then reverses the conveyors to load the piece back onto the car all the way, and then travels to the appropriate bin. Similarly, the system may include a device for selectively applying labels to the pieces. Similar to the above example of printing markings onto the pieces, the labeler may be positioned along the track. The cars selectively stop at the labeler on route to the appropriate bin and at least partially discharge the mail piece toward the labeler. The labeler then applies a label onto the mail piece and the conveyor on the car then reverses to load the piece back onto the car.

In addition to outgoing mail applications, it may be desirable to incorporate a printer and/or a labeler in systems configured to process incoming mail. For instance, when sorting incoming mail pieces, it may be desirable to print certain information, such as sort codes, a time stamp or audit trail information onto some or all of the pieces being processed. In some instances such information may be printed directly onto the mail pieces. In other instances, a label may be applied to the mail pieces and the information may be printed on the label.

In addition to a printer and a labeler, the system may include a scale for weighing the mail pieces. The scale may be positioned along the track 110, such as along the loading column. To weigh a piece, the car stops adjacent the scale, and ejects the piece from the car onto the scale by driving the conveyor belts 212. Preferably, the scale includes a conveyor or transfer mechanism for discharging the piece from the scale and back onto the car or onto a subsequent car. When the piece is loaded onto the car from the scale, the car drives the conveyors to load the piece as discussed above in connection with the loading station.

It should therefore be understood that this invention is not limited to the particular embodiments described herein, but is intended to include all changes and modifications that are within the scope and spirit of the invention as set forth in the claims.

What is claimed is:

1. A material handling apparatus for sorting items, comprising:
   a plurality of bins for receiving items, comprising:
      a plurality of front bins; and
      a plurality of rear bins wherein the rear bins are spaced apart from the front bins so that a gap is formed between the front bins and the rear bins;
   a first lower track;
   a first upper track vertically spaced from the first lower track;
   a second lower track horizontally spaced from the first lower track;
   a second upper track vertically spaced from the first lower track and horizontally spaced from the first upper track;
      wherein the first lower track and first upper track are positioned adjacent the front bins and extend in a first horizontal direction;
      wherein the second lower track and second upper track are positioned adjacent the rear bins and extend in the first horizontal direction;
   an input conveyor for displacing items toward a loading location;
   a plurality of delivery vehicles operable to receive items at the loading location and deliver the items to the bins;
      wherein one of the delivery vehicles comprises:
         a first wheel configured to ride along the first upper track and the first lower track;
         a second wheel configured to ride along the second upper track and the second lower track;
         a reversible conveyor belt forming a horizontal surface for supporting an item, wherein the conveyor belt is configured to displace the item on the vehicle in a second horizontal direction transverse the first horizontal direction to load the item onto the vehicle and to transfer the item from the vehicle into one of the bins wherein operation of the conveyor belt in a first direction is operable to displace the item from the delivery vehicle into one of the front bins and operation of the conveyor belt in a second direction is operable to displace the item from the delivery vehicle into one of the rear bins;
         an onboard motor connected with the first wheel and the second wheel;
         wherein the delivery vehicle is configured to travel within the gap along a path forming a vertical loop having a forward leg extending from the loading location to one of the bins and a return leg that extends from the one bin to the loading location;
         wherein the first and second upper tracks form a segment of the forward leg and the first and second lower tracks form segments of the return leg for one of the delivery vehicles.

2. The apparatus of claim 1 comprising a scanner positioned along the input conveyor for scanning an item to detect an identifying feature of the item being delivered to the one delivery vehicle.

3. The apparatus of claim 2 comprising a controller configured to identify the bin to which the item is to be delivered in response to the identifying feature detected by the scanner wherein the controller controls operation of the delivery vehicle to direct the delivery vehicle to the identified bin.

4. The apparatus of claim 1 wherein the one delivery vehicle comprises:
a rechargeable power source for powering the motor; and
a charging contact;
wherein the apparatus comprises a conductive element positioned adjacent the vertical loop that is cooperable with the charging contact to recharge the power source of the vehicle as the vehicle moves along the vertical loop.

5. The apparatus of claim 1 comprising:
a first vertical element having an upper end adjacent the first upper track and a lower end adjacent the first lower track and
a second vertical element having an upper end adjacent the second upper track and a lower end adjacent the second lower track
wherein the first and second vertical elements engage the one delivery vehicle as the one delivery vehicle travels vertically along the forward leg.

6. The apparatus of claim 5 comprising
a third vertical element spaced apart from the first vertical element and having an upper end adjacent the first upper track and a lower end adjacent the first lower track; and
a fourth vertical element spaced apart from the second vertical element and having an upper end adjacent the second upper track and a lower end adjacent the second lower track
wherein the first and second vertical elements engage the one delivery vehicle as the one deliver vehicle travels vertically along the return leg.

7. The apparatus of claim 5 wherein the delivery vehicle has a horizontal orientation as the delivery vehicle rides along the first and second lower tracks and wherein the delivery vehicle engages the first and second vertical elements to maintain the orientation of the one delivery vehicle in the horizontal orientation as the one delivery vehicle travels vertically along the forward leg.

8. The apparatus of claim 1 wherein the front bins are arranged in a plurality of horizontal rows or vertical columns and the rear bins are arranged in a plurality of horizontal rows or vertical columns.

9. A material handling apparatus for sorting items, comprising:
a plurality of bins for receiving items, comprising:
a plurality of front bins; and
a plurality of rear bins wherein the rear bins are spaced apart from the front bins so that a gap is formed between the front bins and the rear bins;
an input conveyor for displacing items toward a loading location;
a guide within the gap forming a vertical loop between the front bins and the rear bins wherein the vertical loop starts at the loading location and returns to the loading location and comprises:
an upper leg extending in a first horizontal direction;
a lower leg vertically spaced from the upper leg and extending in the first horizontal direction;
a first vertical leg adjacent a first end of the upper leg and a first end of the lower leg;
a second vertical leg spaced apart from the first vertical leg and adjacent a second end of the upper leg and a second end of the lower leg;
a plurality of delivery vehicles operable to receive items at the loading location and deliver the items to the bins;
wherein one of the delivery vehicles comprises:
a first wheel on a first side of the delivery vehicle and a second wheel on a second side of the delivery vehicle for supporting the delivery vehicle as the delivery vehicle travels horizontally along the upper and lower legs;
a reversible conveyor belt forming a horizontal surface for supporting an item, wherein the conveyor belt is configured to displace the item on the vehicle in a second horizontal direction transverse the first horizontal direction to load the item onto the vehicle and to transfer the item from the vehicle into one of the bins wherein operation of the conveyor belt in a first direction is operable to displace the item from the delivery vehicle into one of the front bins and operation of the conveyor belt in a second direction is operable to displace the item from the delivery vehicle into one of the rear bins;
an onboard motor connected with the first wheel and the second wheel;
wherein the delivery vehicle is operable to travel within the gap along the vertical loop in both vertical and horizontal directions.

10. The apparatus of claim 9 comprising a scanner positioned along the input conveyor for scanning an item to detect an identifying feature of the item being delivered to the one delivery vehicle.

11. The apparatus of claim 10 comprising a controller configured to identify the bin to which the item is to be delivered in response to the identifying feature detected by the scanner wherein the controller controls operation of the delivery vehicle to direct the delivery vehicle to the identified bin.

12. The apparatus of claim 9 wherein the one delivery vehicle comprises:
a rechargeable power source for powering the motor; and
a charging contact;
wherein the apparatus comprises a conductive element positioned adjacent the vertical loop that is cooperable with the charging contact to recharge the power source of the vehicle as the vehicle moves along the vertical loop.

* * * * *

UNITED STATES PATENT AND TRADEMARK OFFICE
CERTIFICATE OF CORRECTION

PATENT NO. : 11,478,825 B2
APPLICATION NO. : 17/743403
DATED : October 25, 2022
INVENTOR(S) : George Hayduchok and Robert DeWitt It is certified that error appears in the above-identified patent and that said Letters Patent is hereby corrected as shown below:

In the Claims

In Claim 6:

| | Reads | Should Read |
|---|---|---|
| Column 21 Line 34 | "wherein the first and second vertical elements engage" | --wherein the third and fourth vertical elements engage-- |

Signed and Sealed this
Twenty-eighth Day of February, 2023

Katherine Kelly Vidal
*Director of the United States Patent and Trademark Office*